US012360424B2

(12) United States Patent
Haruyama et al.

(10) Patent No.: US 12,360,424 B2
(45) Date of Patent: Jul. 15, 2025

(54) LIQUID CRYSTAL DEVICE, DISPLAY DEVICE, AND OPTICAL MODULATION MODULE

(71) Applicant: SEIKO EPSON CORPORATION, Tokyo (JP)

(72) Inventors: Akihide Haruyama, Suwa (JP); Yusuke Komuro, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 157 days.

(21) Appl. No.: 18/174,014

(22) Filed: Feb. 24, 2023

(65) Prior Publication Data

US 2023/0273493 A1    Aug. 31, 2023

(30) Foreign Application Priority Data

Feb. 25, 2022  (JP) .................................. 2022-027693

(51) Int. Cl.
*G02F 1/139* (2006.01)
*G02F 1/1335* (2006.01)
*G02F 1/13363* (2006.01)
*G02F 1/1337* (2006.01)
*G02F 1/1347* (2006.01)
*G02F 1/137* (2006.01)

(52) U.S. Cl.
CPC ...... *G02F 1/1393* (2013.01); *G02F 1/133528* (2013.01); *G02F 1/13363* (2013.01); *G02F 1/133638* (2021.01); *G02F 1/1337* (2013.01); *G02F 1/13471* (2013.01); *G02F 1/13712* (2021.01)

(58) Field of Classification Search
CPC ........... G02F 1/13363; G02F 1/133638; G02F 1/1393; G02F 1/133528; G02F 1/1337; G02F 1/13471; G02F 1/13712; G03B 21/006
See application file for complete search history.

(56) References Cited

U.S. PATENT DOCUMENTS

| | | | |
|---|---|---|---|
| 6,624,862 B1 | 9/2003 | Hayashi et al. | |
| 2009/0128719 A1 | 5/2009 | Tateno | |
| 2022/0382109 A1* | 12/2022 | Haruyama | .......... G02F 1/13363 |
| 2023/0273466 A1* | 8/2023 | Hosaka | ................. G02F 1/1347 |
| | | | 349/75 |

FOREIGN PATENT DOCUMENTS

| | | | |
|---|---|---|---|
| JP | 2000-347177 A | 12/2000 | |
| JP | 2001-142091 A | 5/2001 | |
| JP | 2007-286141 A | 11/2007 | |
| JP | 2012-252206 A | 12/2012 | |
| JP | 2013-190805 A | 9/2013 | |

* cited by examiner

*Primary Examiner* — Jia X Pan
(74) *Attorney, Agent, or Firm* — Oliff PLC

(57) ABSTRACT

A liquid crystal device includes a liquid crystal panel including a first liquid crystal layer, a first polarizing plate provided on a light incidence side of the liquid crystal panel, a second polarizing plate provided on a light emission side of the liquid crystal panel, a first phase difference adjusting element arranged between the first polarizing plate and the liquid crystal panel and including a second liquid crystal layer, a second phase difference adjusting element arranged between the liquid crystal panel and the second polarizing plate and including a third liquid crystal layer, and a control unit configured to control a phase difference of the second liquid crystal layer and a phase difference of the third liquid crystal layer.

5 Claims, 13 Drawing Sheets

LIQUID CRYSTAL DEVICE, DISPLAY DEVICE, AND OPTICAL MODULATION MODULE

The present application is based on, and claims priority from JP Application Serial Number 2022-027693, filed Feb. 25, 2022, the disclosure of which is hereby incorporated by reference herein in its entirety.

BACKGROUND

1. Technical Field

The present disclosure relates to a liquid crystal device, a display device, and an optical modulation module.

2. Related Art

When, on a display screen of a liquid crystal panel, for example, a white pixel and a black pixel are adjacent to each other at a boundary between a character and a background, a high potential is applied to a pixel electrode of the white pixel whereas a low potential is applied to a pixel electrode of the black pixel, which may generate a reverse tilt domain where liquid crystal molecules are aligned in a direction different from an original alignment direction due to a horizontal electric field between the pixel electrode of the white pixel and the pixel electrode of the black pixel.

It is known that generation of a reverse tilt domain on the liquid crystal panel causes degradation of display quality. In particular, a horizontal electric field has a larger influence on a small-sized and high-resolution liquid crystal panel, and hence suppression of a reverse tilt domain is one of the problems to be solved.

As a technique of suppressing generation of a reverse tilt domain as described above, JP-A-2012-252206 discloses a technique of weakening a horizontal electric field by correcting tone data so as to reduce a difference between voltages applied to pixels.

However, when tone data is corrected so as to weaken a horizontal electric field, a change of a display content depending on this correction is more likely to be visually recognized by a viewer as, for example, a blurry image, which may cause another problem, that is, occurrence of display contradiction.

An advantage of some aspects of the present disclosure is to suppress degradation of display quality due to a reverse tilt domain.

SUMMARY

According to an aspect of the present application, a liquid crystal device includes a liquid crystal panel including a first liquid crystal layer, a first polarizing element provided on a light incidence side of the liquid crystal panel, a second polarizing element provided on a light emission side of the liquid crystal panel, a first phase difference adjusting element arranged between the first polarizing element and the liquid crystal panel and including a second liquid crystal layer, a second phase difference adjusting element arranged between the liquid crystal panel and the second polarizing element and including a third liquid crystal layer, and a control unit configured to control a phase difference of the second liquid crystal layer and a phase difference of the third liquid crystal layer.

According to an aspect of the present application, in a display device including a first liquid crystal panel configured to modulate light having a first wavelength and a second liquid crystal panel configured to modulate light having a second wavelength different from the first wavelength, the display device includes a first phase difference adjusting element arranged on a light incidence side of the first liquid crystal panel, a second phase difference adjusting element arranged on a light emission side of the first liquid crystal panel, and a control unit configured to control a phase difference of the first phase difference adjusting element and a phase difference of the second phase difference adjusting element.

According to an aspect of the present application, an optical modulation module includes a liquid crystal panel including a first liquid crystal layer, a first polarizing element provided on a light incidence side of the liquid crystal panel, a second polarizing element provided on a light emission side of the liquid crystal panel, a first phase difference adjusting element arranged between the first polarizing element and the liquid crystal panel and including a second liquid crystal layer, and a second phase difference adjusting element arranged between the liquid crystal panel and the second polarizing element and including a third liquid crystal layer.

DESCRIPTION OF EXEMPLARY EMBODIMENTS

Exemplary embodiments of the present disclosure are described below with reference to the drawings.

Here, in each of the following drawings, scales of the members are made different from those of actual ones in order to make the members recognizable in size.

Further, in each of the following drawings, for convenience of explanation, description is made appropriately using an X-axis, a Y-axis, and a Z-axis that are orthogonal to one another. A direction along the X-axis is denoted with a direction X1, and a direction opposite to the direction X1 is denoted with a direction X2. A direction along the Y-axis is denoted with a direction Y1, and a direction opposite to the direction Y1 is denoted with a direction Y2. A direction along the Z-axis is denoted with a direction Z1, and a direction opposite to the direction Z1 is denoted with a direction Z2. Note that, in the present exemplary embodiment, the direction X1 corresponds to a first direction, and the direction Y1 corresponds to a second direction.

In the following description, viewing in the direction Z2 or the direction Z1 is expressed as a "plan view" or "planar". Further, viewing a cross-section containing the Z-axis in a vertical direction is expressed as a "cross-sectional view" or "cross-sectional".

Moreover, in the following description, for example, the expression "at a substrate" regarding a substrate indicates any one of a case of arrangement on a substrate in a contacting manner, a case of arrangement through another structure object on a substrate, and a case in which a part is arranged on a substrate in a contacting manner and another part is arranged through another structure object on the substrate.

Figure 1:
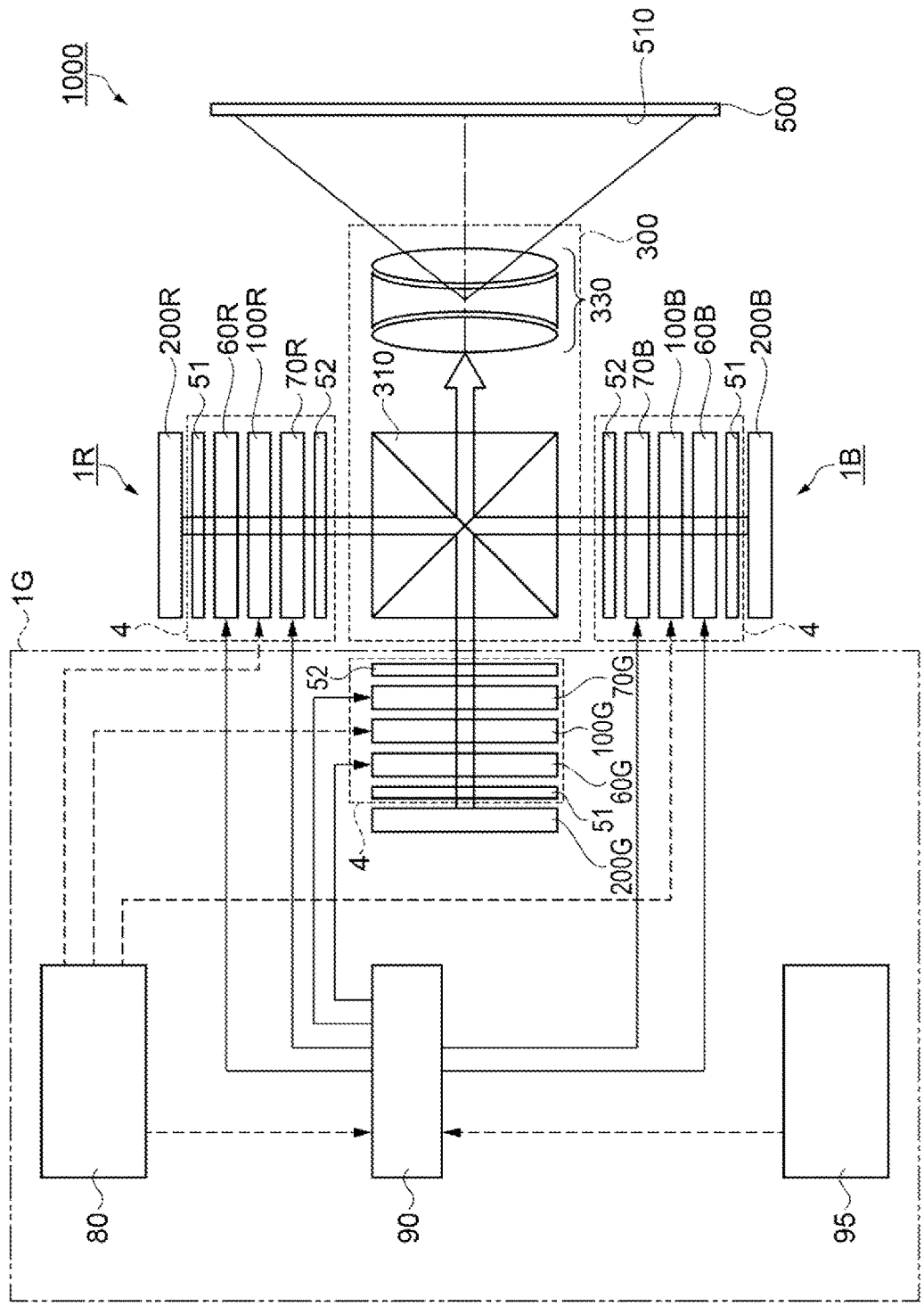
FIG. 1 is a schematic configuration diagram illustrating a projection-type display device using a liquid crystal device according to a first exemplary embodiment.

1. First Exemplary Embodiment 1.1. Outline of Projection-Type Display Device Using Liquid Crystal Device FIG. 1 is an explanatory diagram illustrating a schematic configuration of a projection-type display device using a liquid crystal device according to the present exemplary embodiment.

In the present exemplary embodiment, a projection-type display device 1000 is an example of a display device. The projection-type display device 1000 is configured to include a liquid crystal device 1.

Note that, in the present exemplary embodiment, in the configurations included in the liquid crystal device 1, a configuration including a liquid crystal panel 100, a first polarizing plate 51 being a first polarizing element, a second polarizing plate 52 being a second polarizing element, a first phase difference controlling element 60, and a second phase difference controlling element 70, which are described later, is referred to as an optical modulation module 4 in some cases. The optical modulation module 4 is not required to include all the configurations included in the liquid crystal device 1, and is only required to include at least the first phase difference controlling element 60 being a first phase difference adjusting element and the second phase difference controlling element 70 being a second phase difference adjusting element, which are described later. In a functional sense, a function of converting linearly polarized light into desired polarized light between linearly polarized light and circularly polarized light and emitting the resultant light to the liquid crystal panel 100 and a function of converting the polarization state of the light, which is emitted from the liquid crystal panel 100, from the desired polarized light to linearly polarized light and emitting the resultant light are only required to be provided.

With regard to the configurations included in the optical modulation module 4, all the configurations are not required to be coupled physically to one another or formed integrally with one another. Even when the configurations or some of the configurations are physically away from each other, electric or optical relationship is only required to be established therebetween.

The projection-type display device 1000 includes three laser light sources 200R, 200G, and 200B corresponding to R, G, and B as light sources, three liquid crystal devices 1R, 1G, and 1B corresponding to R, G, and B as image display devices, and a projection optical system 300.

The laser light source 200R emits red-colored light. A center wavelength λ of the red-colored light is 610 nm. The laser light source 200G emits green-colored light. A center wavelength λ of the green-colored light is 550 nm. The laser light source 200B emits blue-colored light. A center wavelength λ of the blue-colored light is 455 nm.

Each of the liquid crystal devices 1R, 1G, and 1B includes the first polarizing plate 51 being a first polarizing element, the first phase difference controlling element 60 being a first phase difference adjusting element, the liquid crystal panel 100, the second phase difference controlling element 70 being a second phase difference adjusting element, and the second polarizing plate 52 being a second polarizing element. Note that, with regard to the first polarizing plate 51, when light emitted from the laser light sources 200R, 200G, and 200B is linearly polarized light, the first polarizing plate 51 may be omitted. When linearly polarized light emitted from the laser light sources 200R, 200G, and 200B directly enters the first phase difference controlling element 60, the laser light sources 200R, 200G, and 200B correspond to the first polarizing plate 51.

A liquid crystal panel 100R of the liquid crystal device 1R modulates the red-colored light emitted from the laser light source 200R, based on red tone data. A liquid crystal panel 100G of the liquid crystal device 1G modulates the green-colored light emitted from the laser light source 200G, based on green tone data. A liquid crystal panel 100B of the liquid crystal device 1B modulates the blue-colored light emitted from the laser light source 200B, based on blue tone data.

The first polarizing plate 51 adjusts polarization of the light emitted from the laser light source 200R, 200G, or 200B, and emits linearly polarized light to the first phase difference controlling element 60.

A first phase difference controlling element 60R of the liquid crystal device 1R is arranged between the first polarizing plate 51 and the liquid crystal panel 100R, and keeps the polarization state of the linearly polarized incident light as linearly polarized light or changes the polarization state from linearly polarized light to elliptically polarized light or circularly polarized light in accordance with a phase difference of the first phase difference controlling element 60R. Thus, the resultant light is emitted to the liquid crystal panel 100. Note that the phase difference of the first phase difference controlling element 60R is controlled to be variable within a range from 0 (zero) to λ/4, by a method described later.

When the phase difference is controlled to be zero, the first phase difference controlling element 60R emits the linearly polarized incident light from the first polarizing plate 51 while hardly changing the polarization state thereof. When the phase difference is controlled to be λ/8, the first phase difference controlling element 60R changes the linearly polarized incident light from the first polarizing plate 51 to elliptically polarized light, and emits the resultant light. Similarly, when the phase difference is controlled to be λ/4, the first phase difference controlling element 60R changes the linearly polarized light to circularly polarized light, and emits the resultant light.

Note that a first phase difference controlling element 60G of the liquid crystal device 1G and a first phase difference controlling element 60B of the liquid crystal device 1B are configured similarly to the first phase difference controlling element 60R.

A second phase difference controlling element 70R of the liquid crystal device 1R is arranged between the liquid crystal panel 100R and the second polarizing plate 52, and the phase difference of the second phase difference controlling element 70R is controlled so that the polarization state of the light emitted from the liquid crystal panel 100R is linearly polarized light.

When the phase difference of the first phase difference controlling element 60R is set to be zero, the phase difference of the second phase difference controlling element 70R is also set to be zero, and the second phase difference controlling element 70R causes the linearly polarized light emitted from the liquid crystal panel 100R to pass therethrough without changing the polarization state of the linearly polarized light.

When the phase difference of the first phase difference controlling element 60R is set to be λ/8, the phase difference of the second phase difference controlling element 70R is also set to be λ/8, and the second phase difference controlling element 70R changes the elliptically polarized light emitted from the liquid crystal panel 100R to linearly polarized light, and emits the resultant light. Similarly, when the phase difference of the first phase difference controlling element 60R is set to be λ/4, the phase difference of the second phase difference controlling element 70R is also set to be λ/4, and the second phase difference controlling element 70R changes the circularly polarized light emitted from the liquid crystal panel 100R to linearly polarized light, and emits the resultant light.

Note that a second phase difference controlling element 70G of the liquid crystal device 1G and a second phase difference controlling element 70B of the liquid crystal device 1B are configured similarly to the second phase difference controlling element 70R.

The second polarizing plate 52 polarizes the light emitted from the second phase difference controlling element 70, and causes the light to enter a dichroic prism 310.

The dichroic prism 310 synthesizes the light emitted from the liquid crystal panel 100R, the light emitted from the liquid crystal panel 100G, and the light emitted from the liquid crystal panel 100B.

A projection lens 330 projects the light emitted from the dichroic prism 310 onto a projection surface 510 of the screen 500 in a magnified manner.

The liquid crystal device 1R includes an image processing unit 80, a phase difference adjusting unit 90, and a brightness detecting unit 95. Note that one image processing unit 80, one phase difference adjusting unit 90, and one brightness detecting unit 95 are only required to be provided in common for the liquid crystal devices 1R, 1G, and 1B, but also there may be adopted a configuration in which each of the liquid crystal devices 1R, 1G, and 1B includes the image processing unit 80, the phase difference adjusting unit 90, and the brightness detecting unit 95.

The image processing unit 80 supplies tone data for respective colors to the liquid crystal panels 100R, 100G, and 100B, based on image data. The image processing unit 80 analyzes the image data, and outputs the analysis information to the phase difference adjusting unit 90. In the present exemplary embodiment, for example, the analysis information is average tone information or contrast information. Note that the analysis information is not limited thereto, and may be content information relating to a movie, sports, a game, scenery, a character, a moving image, a still image, and the like.

The brightness detecting unit 95 detects brightness of a location in which the screen 500 is installed, and outputs the detected brightness information to the phase difference adjusting unit 90.

Based on the analysis information from the image processing unit 80 and/or the brightness information from the brightness detecting unit 95, the phase difference adjusting unit 90 outputs phase difference control signals RcR, RcG, and RcB for controlling phase difference of the first phase difference controlling elements 60R, 60G, and 60B and the second phase difference controlling elements 70R, 70G, and 70B.

Note that there may be adopted a configuration in which the first phase difference controlling element 60 and the second phase difference controlling element 70 are provided in only one or two liquid crystal devices of the liquid crystal devices 1R, 1G, and 1B. For example, there may be adopted a configuration in which the first phase difference controlling elements 60G and 60R and the second phase difference controlling elements 70G and 70R are only provided in the liquid crystal device 1G corresponding to the green-colored light, which is easily noticeable with a display failure due to a reverse tilt domain, or in the liquid crystal devices 1G and 1R corresponding to the green-colored light and the red-colored light, without providing the first phase difference controlling element 60B and the second phase difference controlling element 70B in the liquid crystal device 1B corresponding to the blue-colored light, which is less easily noticeable with a display failure due to a reverse tilt domain.

1.2. Outline of Liquid Crystal Panel Combined with Optical Modulation Module

Figure 2:
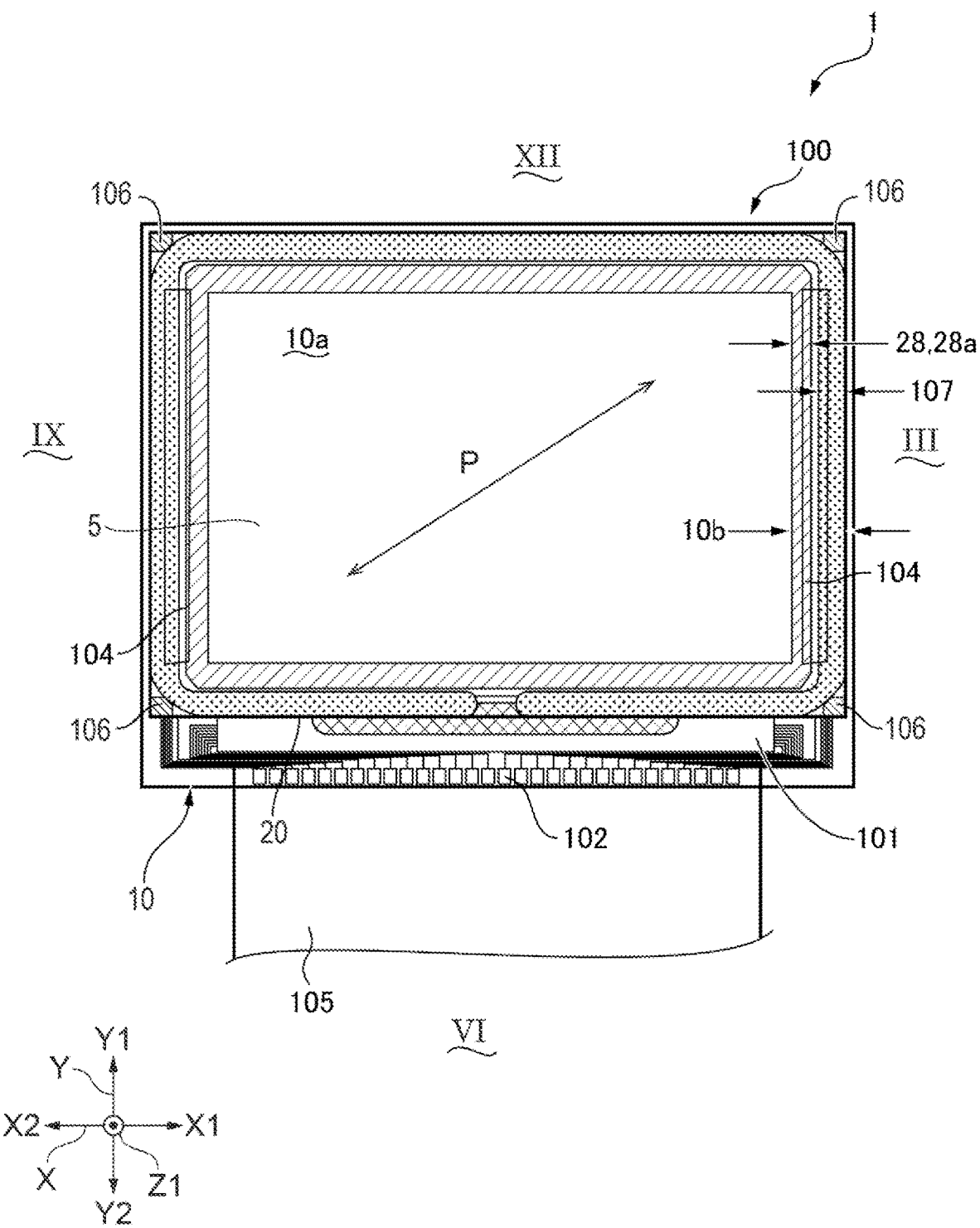
FIG. 2 is a plan view illustrating an aspect of a liquid crystal panel combined with the liquid crystal device.

FIG. 2 is a plan view illustrating a schematic configuration of the liquid crystal panel combined with the optical modulation module, and illustrates a state in which the liquid crystal panel 100 is viewed in the direction Z2. Note that each of the liquid crystal panels 100R, 100G, and 100B is configured similarly to the liquid crystal panel 100.

In the present exemplary embodiment, as the liquid crystal panel 100, an active drive type liquid crystal panel including a Thin Film Transistor (TFT) as a pixel transistor for each pixel is described as an example.

In the liquid crystal panel 100, a first transmissive substrate 10 and a second transmissive substrate 20 are laminated together by a seal material 107 with a predetermined gap in between. The seal material 107 is provided along an outer edge of the second substrate 20 to have a frame shape. A liquid crystal layer 5 being a first liquid crystal layer is arranged in a region surrounded by the seal material 107 between the first substrate 10 and the second substrate 20.

In the liquid crystal panel 100, the first substrate 10 and the second substrate 20 each have a quadrangular shape. In a substantially central portion of the liquid crystal panel 100, a display region 10a is provided as a rectangular region having a longer dimension in the direction from 3 o'clock III toward 9 o'clock IX on an analog clock and a shorter dimension in the direction from 12 o'clock XII toward 6 o'clock VI on an analog clock. The display region 10a is surrounded by a peripheral region 10b. Note that the direction from 3 o'clock III toward 9 o'clock IX on an analog clock is a direction along the X-axis, and the direction from 12 o'clock XII toward 6 o'clock VI on an analog clock is a direction along the Y-axis.

The peripheral region 10b having a rectangular frame shape is provided between the display region 10a and an outer peripheral edge of the second substrate 20. The seal material 107 is provided in a substantially rectangular frame shape in the peripheral region 10b.

A data line drive circuit 101, a plurality of terminals 102, and a scanning line drive circuit 104 are arranged on the outer side of the display region 10a in a surface of the first substrate 10 on the side of the second substrate 20.

A flexible wiring substrate 105 is coupled to the terminals 102, and various potentials and various signals are input to the first substrate 10 via the flexible wiring substrate 105.

A light-blocking film 28 having light-blocking properties formed from a metal compound or the like is formed at the second substrate 20. For example, the light-blocking film 28 is a partition 28a arranged along an outer peripheral edge of the display region 10a.

The first substrate 10 includes an inter-substrate conduction electrode 106 formed in a region positioning outside the seal material 107 and overlapping with a corner portion of the second substrate 20 so that electrical conduction is established between the first substrate 10 and the second substrate 20.

Note that the direction P illustrated in FIG. 2 indicates an alignment direction of liquid crystal molecules 5a of the liquid crystal layer 5. In the present exemplary embodiment, the alignment direction P is a direction from 01:30 toward 7:30 on an analog clock in plan view.

1.3. Outline of Optical Modulation Module

Figure 3:
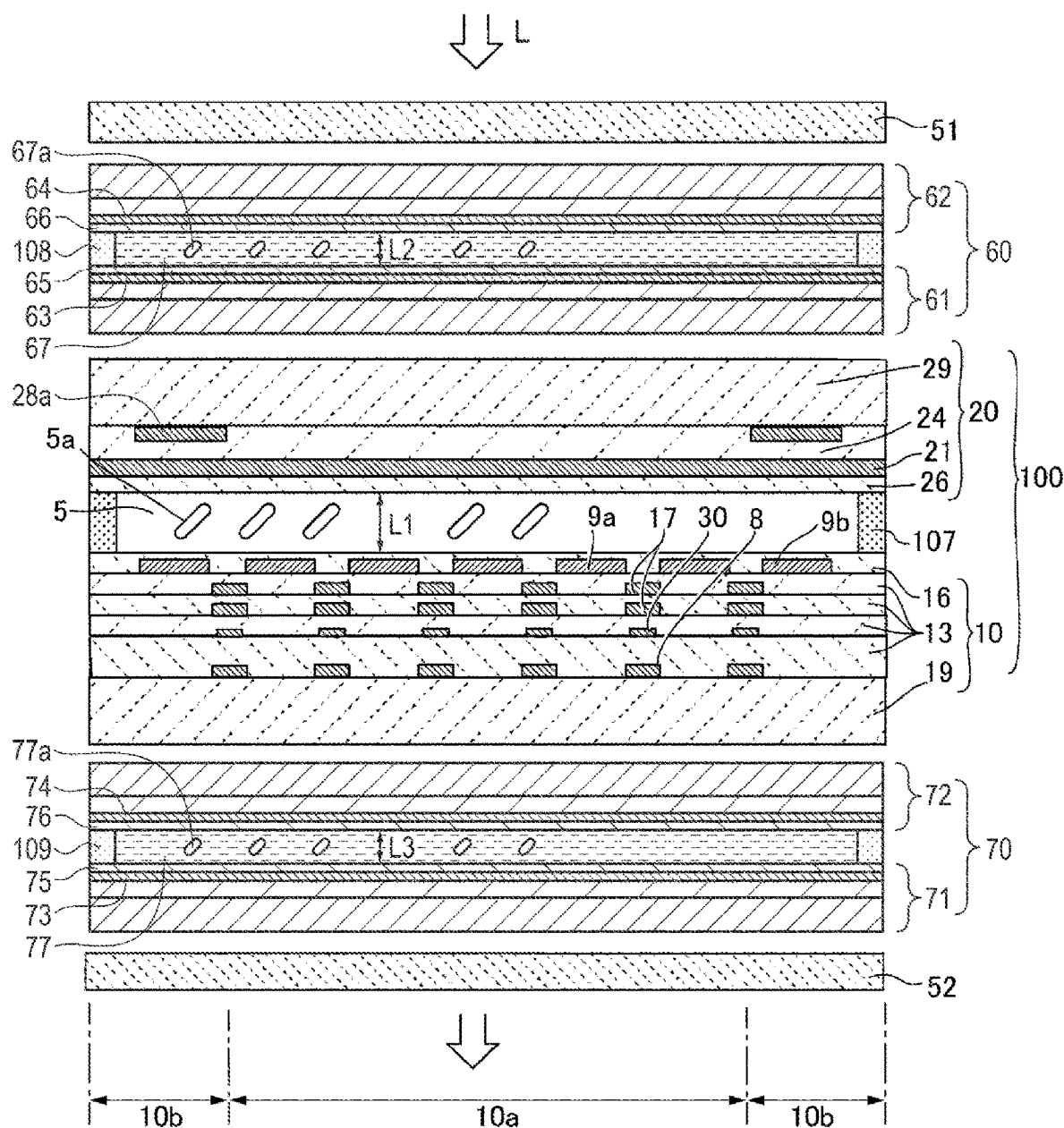
FIG. 3 is an explanatory diagram schematically illustrating a cross-section of the liquid crystal device.

FIG. 3 is a cross-sectional view schematically illustrating a cross-section of the optical modulation module of the present exemplary embodiment.

The liquid crystal device 1 includes the first polarizing plate 51, the first phase difference controlling element 60, the liquid crystal panel 100, the second phase difference controlling element 70, and the second polarizing plate 52 that are arranged sequentially from an incidence side of light L emitted from the laser light source 200. Note that the liquid crystal devices 1R, 1G, and 1B are configured similarly to the liquid crystal device 1.

In the display region 10a of the first substrate 10 of the liquid crystal panel 100, a plurality of transmissive pixel electrodes 9a, each of which is formed of a transmissive conductive film such as an Indium Tin Oxide (ITO) film, and pixel switching elements 30, each of which is electrically coupled to a respective one of the plurality of pixel electrodes 9a, are provided in a matrix pattern. Wiring lines 8 and 17 having light-blocking properties are provided between a plurality of insulating films 13 laminated between a substrate body 19 and the pixel electrodes 9a. A first alignment film 16 formed of a diagonally vapor-deposited inorganic film is formed at the side of the second substrate 20 with respect to the pixel electrodes 9a, and the pixel electrodes 9a are covered with the first alignment film 16.

In the peripheral region 10b of the first substrate 10, dummy pixel electrodes 9b are formed. In the present exemplary embodiment, the first substrate 10 includes a configuration from the substrate body 19 to the first alignment film 16.

The second substrate 20 includes a transmissive substrate body 29 such as quartz and glass. In a substantially entire surface of the second substrate 20 on the side of the first substrate 10, a transmissive common electrode 21 formed of an ITO film or the like is formed. A second alignment film 26 formed of a diagonally vapor-deposited inorganic film is provided between the common electrode 21 and the liquid crystal layer 5.

The partition 28a is formed between the common electrode 21 and a protective layer 24 of the peripheral region 10b on a side opposite to the first substrate 10 with respect to the common electrode 21. The partition 28a overlaps with the dummy pixel electrode 9b of the first substrate 10 in plan view. In the present exemplary embodiment, the second substrate 20 includes a configuration from the substrate body 29 to the second alignment film 26.

The liquid crystal panel 100 is configured as a Vertical Alignment (VA) mode liquid crystal panel in which the liquid crystal molecules 5a having a negative dielectric anisotropy is sandwiched between the first substrate 10 and the second substrate 20 with the seal material 107. In the liquid crystal panel 100 thus configured, upon a voltage applied between the pixel electrodes 9a and the common electrode 21, the liquid crystal molecules 5a of the liquid crystal layer 5 are displaced to reduce the tilt angle with respect to the first substrate 10 and the second substrate 20 along the alignment direction P.

Each of the first phase difference controlling element 60 and the second phase difference controlling element 70 is a VA mode liquid crystal panel similarly to the liquid crystal panel 100.

The first phase difference controlling element 60 includes a fourth substrate 62 arranged on the incidence side of the light L and a third substrate 61 arranged on the emission side of the light L. A liquid crystal layer 67 being a second liquid crystal layer having a negative dielectric anisotropy is sandwiched between the third substrate 61 and the fourth substrate 62 that are laminated together by a seal material 108.

The third substrate 61 includes an electrode 63, and the fourth substrate 62 includes an electrode 64. A third alignment film 65 being a first emission-side alignment film formed of a diagonally vapor-deposited inorganic film is formed between the electrode 63 of the third substrate 61 and the liquid crystal layer 67. A fourth alignment film 66 being a first incidence-side alignment film formed of a diagonally vapor-deposited inorganic film is formed between the electrode 64 of the fourth substrate 62 and the liquid crystal layer 67. The third alignment film 65 and the fourth alignment film 66 align liquid crystal molecules 67a of the liquid crystal layer 67 along the first direction described later.

The second phase difference controlling element 70 includes a sixth substrate 72 arranged on the incidence side of the light L and a fifth substrate 71 arranged on the emission side of the light L. A liquid crystal layer 77 being a third liquid crystal layer having a negative dielectric anisotropy is sandwiched between the fifth substrate 71 and the sixth substrate 72 that are laminated together by a seal material 109.

Each of a thickness d2 of the liquid crystal layer 67 and a thickness d3 of the liquid crystal layer 77 may be equal to or thinner than a thickness d1 of the liquid crystal layer 5 of the liquid crystal panel 100. The thickness d2 of the liquid crystal layer 67 is affected by variation in a cell gap of the first phase difference controlling element 60 in a plane, and hence phase difference variation in a plane during voltage application is caused. Thus, when the thickness d2 of the liquid crystal layer 67 is increased, variation in a transmittance due to variation in a cell gap in a plane with respect to a predetermined voltage can be suppressed. Meanwhile, when the thickness d2 of the liquid crystal layer 67 is increased, a phase difference is increased accordingly, which degrades contrast. The same holds true for the thickness d3 of the liquid crystal layer 77.

Thus, in the present exemplary embodiment, it is assumed that each of the thickness d2 of the liquid crystal layer 67 and the thickness d3 of the liquid crystal layer 77 is equal to or thinner than the thickness d1 of the liquid crystal layer 5 of the liquid crystal panel 100.

A birefringence index Δn2 of the liquid crystal material used for the liquid crystal layer 67 may be smaller than a birefringence index Δn1 of the liquid crystal material used for the liquid crystal layer 5 of the liquid crystal panel 100.

The liquid crystal with a smaller birefringence index Δn has a longer light resistance lifetime than the liquid crystal with a greater birefringence index Δn. Therefore, when the birefringence index Δn2 of the liquid crystal material used for the first phase difference controlling element 60 arranged on the light incidence side of the liquid crystal panel 100 is smaller than Δn1 of the liquid crystal material used for the liquid crystal panel 100, the light resistance lifetime of the first phase difference controlling element 60 can be prevented from expiring prior to the liquid crystal panel 100.

Similarly, a birefringence index Δn3 of the liquid crystal material used for the liquid crystal layer 77 may also be smaller than the birefringence index Δn1 of the liquid crystal material used for the liquid crystal layer 5 of the liquid crystal panel 100. With this, a light resistance lifetime of the second phase difference controlling element 70 can be prevented from expiring prior to the liquid crystal panel 100.

The fifth substrate 71 includes an electrode 73, and the sixth substrate 72 includes an electrode 74. A fifth alignment film 75 being a second emission-side alignment film formed of a diagonally vapor-deposited inorganic film is formed between the electrode 73 of the fifth substrate 71 and the liquid crystal layer 77. A sixth alignment film 76 being a second incidence-side alignment film formed of a diagonally vapor-deposited inorganic film is formed between the electrode 74 of the sixth substrate 72 and the liquid crystal layer 77. The fifth alignment film 75 and the sixth alignment film 76 align the liquid crystal molecules 77a of the liquid crystal layer 77 along the second direction intersecting with the first direction described later.

In the present exemplary embodiment, the third substrate 61, the fourth substrate 62, the fifth substrate 71, and the sixth substrate 72 are configured similarly to the second substrate 20 of the liquid crystal panel 100. Note that the partition 28a of the second substrate 20 is not a necessary configuration in the third substrate 61, the fourth substrate 62, the fifth substrate 71, and the sixth substrate 72.

Here, similarly to the first substrate 10 of the liquid crystal panel 100, the third substrate 61 and the fifth substrate 71 may be configured to include the pixel electrodes 9a. With this, there may be adopted a configuration in which a phase difference can be controlled for each region in accordance with a size of a respective one of the pixel electrodes 9a.

In this case, the electrode 63 of the third substrate 61 and the electrode 73 of the fifth substrate 71 are divided into the same shape in plan view. For example, when the electrode 63 of the third substrate 61 is divided into two, an optically transparent region of the third substrate 61 is divided into two regions, that are a first optically transparent region and a second optically transparent region. When the electrode 63 is divided into two regions, different voltage values can be applied to the respective electrodes. Thus, the phase difference of the liquid crystal layer 67 corresponding to the first optically transparent region and the phase difference of the liquid crystal layer 67 corresponding to the second optically transparent region can be individually controlled. The electrode 73 of the fifth substrate 71 is also divided into two having the same shape, and thus an optically transparent region of the fifth substrate 71 is divided into two regions, that are a third optically transparent region corresponding to the first optically transparent region and a fourth optically transparent region corresponding to the second optically transparent region. When the electrode 73 is divided into two regions, different voltage values can be applied to the respective electrodes. In the present exemplary embodiment, the third optically transparent region is controlled to have the same or substantially the same phase difference as the phase difference of the first optically transparent region, and the fourth optically transparent region is controlled to have the same or substantially the same phase difference as the phase difference of the second optically transparent region.

The division number of the electrode 63 and the electrode 73 may be two or the number as many as that of the pixel electrodes 9a. The phase difference can be controlled more finely as the division number is greater. Note that, in view of the fact that a reverse tilt domain is generated over two or a plurality of consecutive pixels in some cases, the division number of the electrode 63 and the electrode 73 may be set to a number less than the number of the pixel electrodes 9a.

In the first phase difference controlling element 60 and the second phase difference controlling element 70, when a voltage is not applied between the electrodes 63 and 64 that drive the liquid crystal layer 67 and between the electrodes 73 and 74 that drive the liquid crystal layer 77, the liquid crystal molecules 67a and 77a of the liquid crystal layers 67 and 77 are aligned vertically with respect to the respective substrate surfaces. In this case, the phase differences of the first phase difference controlling element 60 and the second phase difference controlling element 70 are both zero, and the first phase difference controlling element 60 and the second phase difference controlling element 70 causes the incident light to pass therethrough without changing the polarization state the light.

Note that, strictly speaking, the phase differences of the first phase difference controlling element 60 and the second phase difference controlling element 70 are not zero because, as described later, the liquid crystal molecules 5a are pre-tilted. Thus, in the present exemplary embodiment, the state in which the phase differences of the first phase difference controlling element 60 and the second phase difference controlling element 70 are zero indicates that the liquid crystal layer 67 and the liquid crystal layer 77 are in an original alignment state without a voltage applied thereto.

Meanwhile, when a voltage is applied between the electrodes 63 and 64 and between the electrodes 73 and 74 in the first phase difference controlling element 60 and the second phase difference controlling element 70, and a voltage value to be applied is increased, the liquid crystal molecules 67a and 77a of the liquid crystal layers 67 and 77 are gradually tilted in a direction parallel to the respective substrate surfaces. Along with this, the phase differences of the first phase difference controlling element 60 and the second phase difference controlling element 70 are gradually increased.

The first phase difference controlling element 60 is arranged so that the slow axis forms an angle of 45 degrees with respect to the polarization axis of the first polarizing plate 51, and the second phase difference controlling element 70 is arranged so that the slow axis forms an angel of 45 degrees with respect to the polarization axis of the second polarizing plate 52. In other words, the first phase difference controlling element 60 and the second phase difference controlling element 70 are arranged so that the respective slow axes are orthogonal to each other.

The first polarizing plate 51 and the second polarizing plate 52 are arranged in a crossed-Nicols state in which the polarization axes form an angle of 90 degrees. The liquid crystal panel 100 is configured so that the alignment direction P of the liquid crystal molecules 5a forms an angle of 45 degrees with respect to the polarization axes of the first polarizing plate 51 and the second polarizing plate 52.

In the present exemplary embodiment, the slow axis of the first phase difference controlling element 60 is arranged to be parallel to the alignment direction P of the liquid crystal panel 100, and the slow axis of the second phase difference controlling element 70 is arranged to be orthogonal to the alignment direction P of the liquid crystal panel 100.

In the first phase difference controlling element 60 and the second phase difference controlling element 70, the alignment directions of the liquid crystal molecules 67a and 77a of the liquid crystal layers 67 and 77 are the directions of the slow axes. Thus, in the present exemplary embodiment, the first direction being an alignment direction of the liquid crystal molecules 67a of the liquid crystal layer 67 is parallel to the alignment direction P, and the second direction being an alignment direction of the liquid crystal molecules 77a of the liquid crystal layer 77 is orthogonal to the alignment direction P.

Note that arrangement may be made so that the slow axis of the first phase difference controlling element 60 is orthogonal to the alignment direction P of the liquid crystal panel 100 and the slow axis of the second phase difference controlling element 70 is parallel to the alignment direction P of the liquid crystal panel 100. In this case, the first direction is orthogonal to the alignment direction P, and the second direction is parallel to the alignment direction P.

With this arrangement, the first phase difference controlling element 60 and the second phase difference controlling element 70 control a value of a voltage applied to the liquid crystal layers 67 and 77 and control the phase differences of the liquid crystal layers 67 and 77 to the desired values, so that the polarization state of the light entering the first phase difference controlling element 60 and the second phase difference controlling element 70 can remain as linearly polarized light without changing, can be changed from linearly polarized light to elliptically polarized light or circularly polarized light, or can be changed from elliptically polarized light or circularly polarized light to linearly polarized light.

Note that the angle formed between the polarization axis of the first polarizing plate 51 and the polarization axis of the second polarizing plate 52, the angle formed between the slow axis of the first phase difference controlling element 60 and the slow axis of the second phase difference controlling element 70, and the angle formed between the alignment direction P and the slow axis of the second phase difference controlling element 70 or the first phase difference controlling element 60 are not limited to 90 degrees. In consideration of a tolerance and the like in manufacturing, the angle is only required to fall within a range of 90 degrees±5 degrees.

The angle formed between the polarization axes of the first polarizing plate 51 and the second polarizing plate 52 and the alignment direction P, the angle formed between the slow axis of the first phase difference controlling element 60 and the polarization axis of the first polarizing plate 51, and the angle formed between the slow axis of the second phase difference controlling element 70 and the second polarizing plate 52 are not limited to 45 degrees. In consideration of a tolerance and the like in manufacturing, the angle is only required to fall within a range of 45 degrees±5 degrees.

Further, the angle formed between the alignment direction P and the slow axis of the first phase difference controlling element 60 or the second phase difference controlling element 70 is not limited to 0 degree. In consideration of a tolerance and the like in manufacturing, the angle is only required to fall within a range of 0 degree±5 degrees.

In the present exemplary embodiment, the liquid crystal panel 100 and the first phase difference controlling element 60 are provided as separate configurations, but may be an integrated configuration. In this case, for example, there may be adopted a configuration in which the third substrate 61 is formed at the substrate body 29. Similarly, the liquid crystal panel 100 and the second phase difference controlling element 70 may be an integrated configuration. In this case, for example, there may be adopted a configuration in which the sixth substrate 72 is formed at the substrate body 19.

In the present exemplary embodiment, the first phase difference controlling element 60 and the second phase difference controlling element 70 both have a configuration of adopting a VA mode liquid crystal panel, but are not limited thereto. For example, there may be adopted a liquid crystal panel of such a type that the liquid crystal molecules are aligned in parallel to the substrate in a state where a voltage is not applied to the liquid crystal layer, that is an original alignment state, and the liquid crystal molecules are aligned in the vertical direction with respect to the substrate by applying a voltage to the liquid crystal layer. As the liquid crystal panel thus operating, an Electrically Controlled Birefringence (ECB) mode liquid crystal panel may be adopted.

1.4. Outline of Configuration of Liquid Crystal Layer

Figure 4:
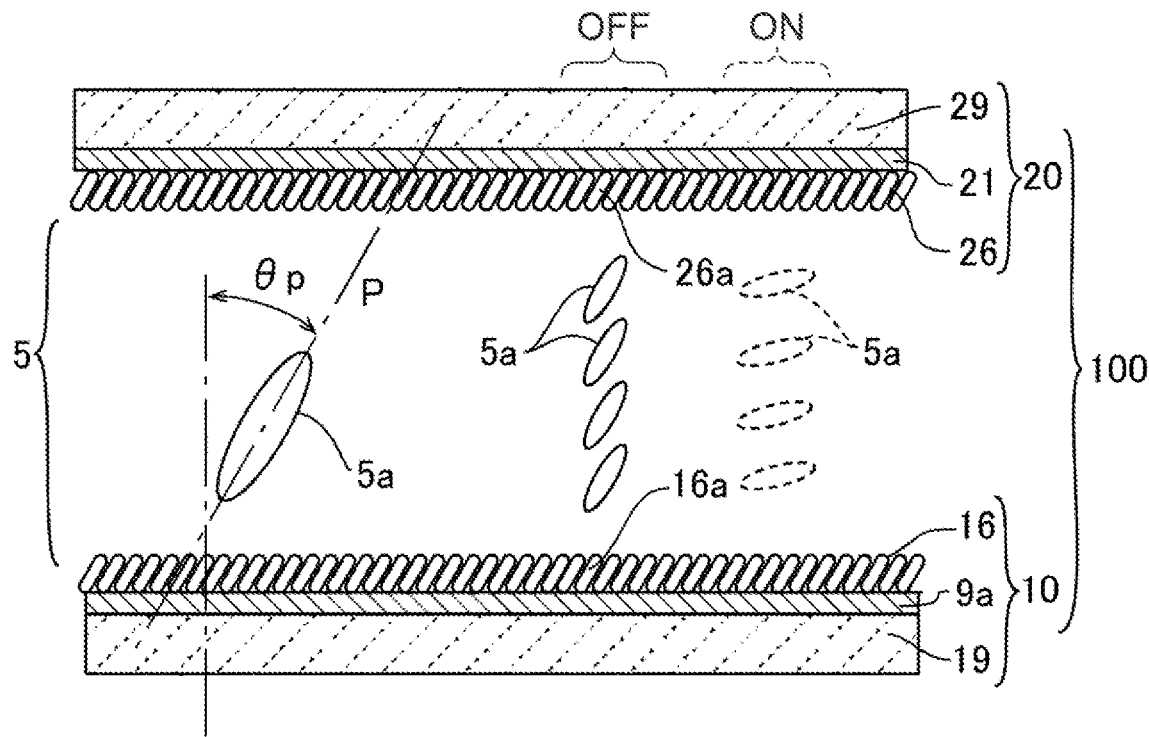
FIG. 4 is an explanatory diagram schematically illustrating a configuration of a liquid crystal layer of the liquid crystal panel.

FIG. 4 is an explanatory diagram schematically illustrating a configuration of the liquid crystal layer of the liquid crystal panel.

The first alignment film 16 and the second alignment film 26 of the liquid crystal panel 100 each include a columnar structure layer in which columnar bodies 16a or 26a each named a column are obliquely formed with respect to the substrate body 19 or 29. Thus, in the first alignment film 16 and the second alignment film 26, the liquid crystal molecules 5a are aligned diagonally with respect to the first substrate 10 and the second substrate 20 so as to cause the liquid crystal molecules 5a to be pre-tilted.

A pre-tilt angle θp refers to an angle defined between a direction vertical to the first substrate 10 and the second substrate 20 and the major axis of the liquid crystal molecules 5a, in other words, the alignment direction P, in an OFF state in which no voltage is applied between the pixel electrodes 9a and the common electrode 21. In the present exemplary embodiment, the pre-tilt angle θp is 5 degrees, for example.

In an ON state in which a voltage is applied between the pixel electrodes 9a and the common electrode 21, the liquid crystal molecules 5a are displaced to reduce the tilt angle with respect to the first substrate 10 and the second substrate 20 along the alignment direction P, as indicated with the broken line. The alignment direction P described herein is a so-called clear vision direction.

The liquid crystal layers 67 and 77 of the first phase difference controlling element 60 and the second phase difference controlling element 70 are also configured similarly to the liquid crystal panel 100.

Figure 5A:
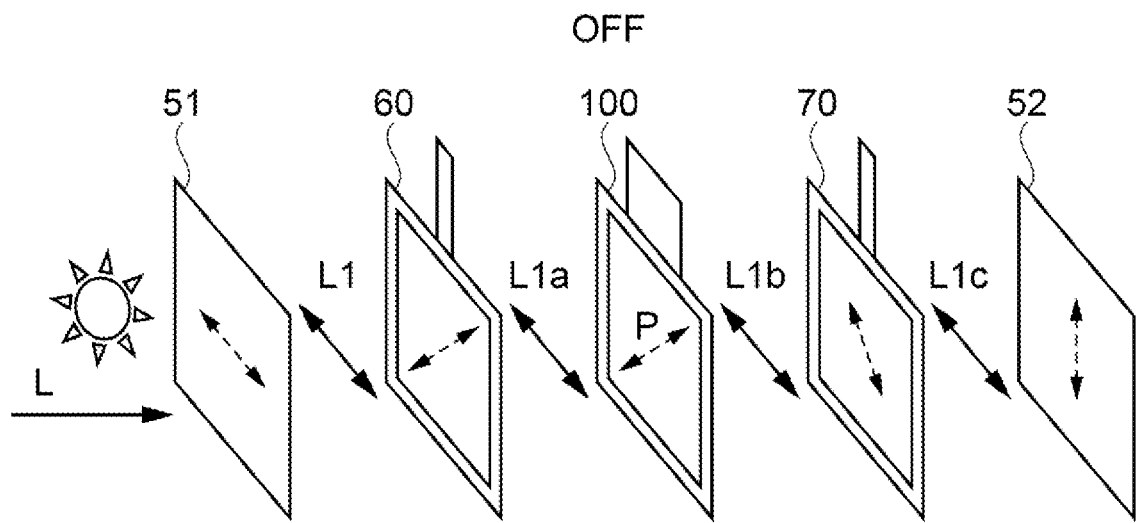
FIG. 5A is an explanatory diagram of a first mode.
Figure 5B:
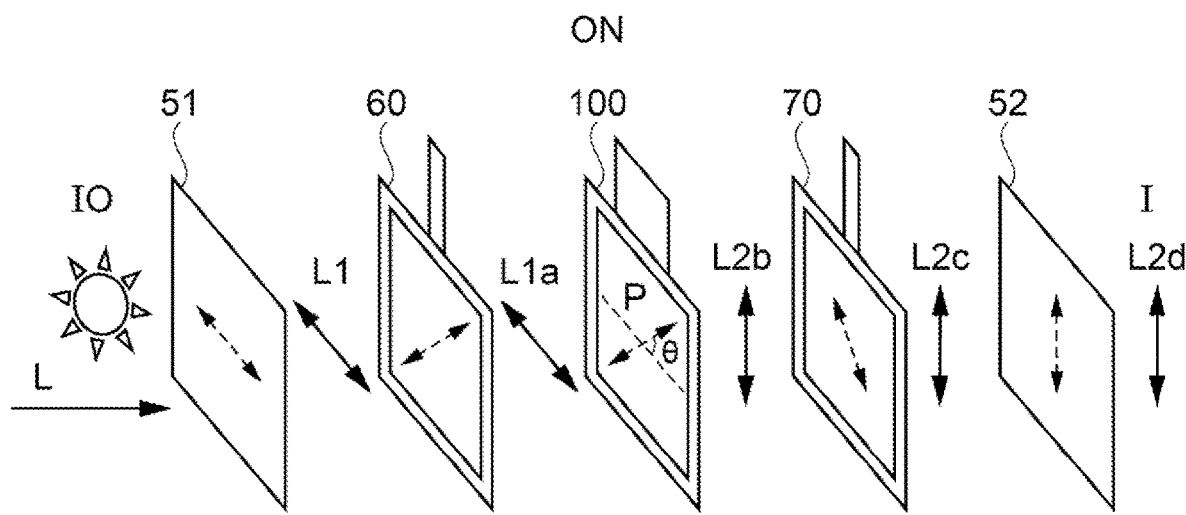
FIG. 5B is an explanatory diagram of the first mode.

1.5. Outline of Linearly Polarized Light Mode and Elliptically Polarized Light or Circularly Polarized Light Mode Each of FIG. 5A and FIG. 5B is an explanatory diagram of a first mode. In the first mode, the phase differences of the first phase difference controlling element 60 and the second phase difference controlling element 70 are controlled to be zero. FIG. 5A illustrates the OFF state in which no voltage is applied between the pixel electrodes 9a and the common electrode 21 of the liquid crystal panel 100, and FIG. 5B illustrates the ON state in which a voltage is applied between the pixel electrodes 9a and the common electrode 21 of the liquid crystal panel 100.

Figure 6A:
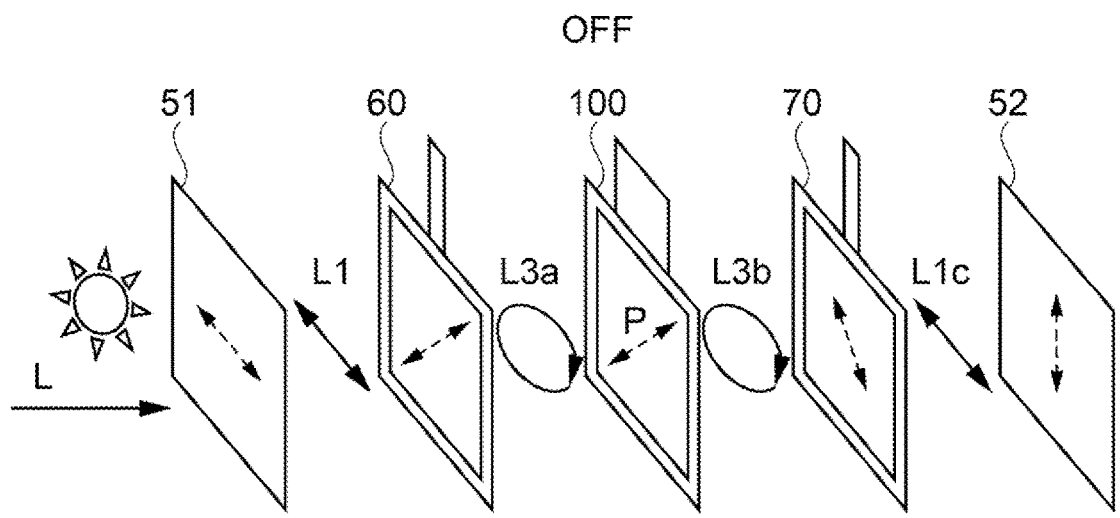
FIG. 6A is an explanatory diagram of a second mode.
Figure 6B:
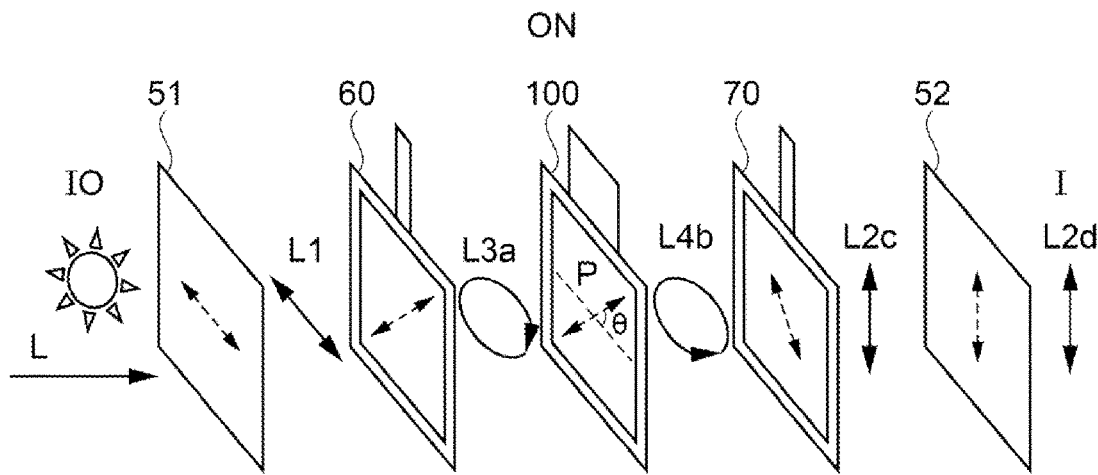
FIG. 6B is an explanatory diagram of the second mode.

Each of FIG. 6A and FIG. 6B is an explanatory diagram of a second mode. In the second mode, the phase differences of the first phase difference controlling element 60 and the second phase difference controlling element 70 are controlled to be any one of $\lambda/24$, $\lambda/12$, $\lambda/8$, $\lambda/6$, and $\lambda/4$, for example. FIG. 6A illustrates the OFF state in which no voltage is applied between the pixel electrodes 9a and the common electrode 21 of the liquid crystal panel 100, and FIG. 6B illustrates the ON state in which a voltage is applied between the pixel electrodes 9a and the common electrode 21 of the liquid crystal panel 100.

In FIG. 5A, FIG. 5B, FIG. 6A, and FIG. 6B, the polarization axis of the first polarizing plate 51, the slow axis of the first phase difference controlling element 60, the alignment direction P of the liquid crystal molecules 5a of the liquid crystal panel 100, the slow axis of the second phase difference controlling element 70, and the polarization axis of the second polarizing plate 52 are indicated with the respective broken lines, and the polarization state of the light and the like are indicated with the solid lines.

In the present exemplary embodiment, the alignment direction P of the liquid crystal molecules 5a of the liquid crystal panel 100 and the slow axis of the first phase difference controlling element 60 are parallel to each other, and the slow axis of the first phase difference controlling element 60 and the slow axis of the second phase difference controlling element 70 are orthogonal to each other.

In the present exemplary embodiment, a value R of each of the phase differences of the first phase difference controlling element 60 and the second phase difference controlling element 70 is controlled to be a value falling within a range from zero to $\lambda/4$ when a wavelength of the incident light into the liquid crystal panel 100 is $\lambda$.

Note that the first phase difference controlling element 60 and the second phase difference controlling element 70 are each controlled to have the same phase difference.

Next, with reference to FIG. 5A and FIG. 5B, description is made on the phase differences of the first phase difference controlling element 60 and the second phase difference controlling element 70 in the first mode.

As illustrated in FIG. 5A and FIG. 5B, when each of the phase differences of the first phase difference controlling element 60 and the second phase difference controlling element 70 is zero, first linearly polarized light L1 emitted from the first polarizing plate 51 passes through the first phase difference controlling element 60 while maintaining the polarization state, and enters the liquid crystal panel 100 as first linearly polarized light L1a.

As illustrated in FIG. 5A, when a pixel of the liquid crystal panel 100 is in the OFF state corresponding to black display, the liquid crystal panel 100 emits first linearly polarized light L1b, and the first linearly polarized light L1b entering the second phase difference controlling element 70 is emitted while maintaining the polarization state. Therefore, first linearly polarized light L1c emitted from the second phase difference controlling element 70 is not emitted from the second polarizing plate 52.

In contrast, as illustrated in FIG. 5B, when a pixel of the liquid crystal panel 100 is in the ON state corresponding to white display, the liquid crystal panel 100 emits second linearly polarized light L2b. The second linearly polarized light L2b passes through the second phase difference controlling element 70 while maintaining the polarization state, enters the second polarizing plate 52 as second linearly polarized light L2c, and is emitted as second linearly polarized light L2d.

An emission light amount I of the second linearly polarized light L2d emitted from the second polarizing plate 52 is expressed in Equation given below.

$$I = I0 \cdot \sin 2(2\theta) \cdot \sin 2(n \cdot \Delta nd/\lambda) \quad \text{Equation (1)}$$

I0=amount of incident light
$\theta$=angle formed between the alignment direction P of the liquid crystal layer 5 and the polarization axis of the first polarizing plate 51
n=refractive index of the liquid crystal layer 5
$\Delta nd$=retardation of the liquid crystal layer 5
$\Delta n$=birefringence index
d=cell gap
$\lambda$=wavelength of incident light Therefore, the emission light amount I is affected by the angle $\theta$ formed between the alignment direction P of the liquid crystal layer 5 and the polarization axis of the first polarizing plate 51. Here, the polarization axis of the polarizing plate corresponds to the optical axis direction of the light being the first linearly polarized light L1a entering the liquid crystal panel 100. Therefore, when alignment of the liquid crystal molecules 5a is disturbed due to a horizontal electric field, the emission light amount I is affected thereby, and a black part is generated on a white screen.

Next, with reference to FIG. 6A and FIG. 6B, description is made on the phase differences of the first phase difference controlling element 60 and the second phase difference controlling element 70 in the second mode.

In a case in which the values of the phase differences of the first phase difference controlling element 60 and the second phase difference controlling element 70 are $\lambda/4$, when the first linearly polarized light L1 enters the first phase difference controlling element 60 with the oscillation direction thereof being at an angle of $\theta=+45$ degrees with respect to the slow axis of the first phase difference controlling element 60, the light emitted from the first phase difference controlling element 60 is clockwise circularly polarized light L3a. In contrast, when the oscillation direction of the first linearly polarized light L1 and the slow axis of the first phase difference controlling element 60 form an angle of $\theta=-45$ degrees, counter-clockwise circularly polarized light L3a is caused.

In the present exemplary embodiment, as illustrated in FIG. 6A, in the liquid crystal panel 100, the first linearly polarized light L1 emitted from the first polarizing plate 51 enters the first phase difference controlling element 60, and the clockwise circularly polarized light L3a enters the liquid crystal panel 100.

Here, when the pixel of the liquid crystal panel 100 is in the OFF state corresponding to black display, the liquid crystal panel 100 emits clockwise circularly polarized light L3b. As a result, the clockwise circularly polarized light L3b enters the second phase difference controlling element 70. Therefore, the second phase difference controlling element 70 emits the first linearly polarized light L1c, and hence the display light is not emitted from the second polarizing plate 52.

In contrast, as illustrated in FIG. 6B, when a pixel of the liquid crystal panel 100 is in the ON state corresponding to white display, the liquid crystal panel 100 emits counter-clockwise circularly polarized light L4b. As a result, the counter-clockwise circularly polarized light enters the second phase difference controlling element 70. Therefore, the second phase difference controlling element 70 emits the second linearly polarized light L2c, and the second linearly polarized light L2c passes through the second polarizing plate 52, and is emitted as the second linearly polarized light L2d.

Here, when light entering the liquid crystal panel 100 is the circularly polarized light L3a, the member sin 2(2θ) in Equation (1) is not present, and hence the emission light amount I is expressed in the following equation. Thus, even when alignment of the liquid crystal molecules 5a is disturbed due to a horizontal electric field, the emission light amount I is not affected thereby, and generation of a black part on a white screen can be suppressed. Thus, when the phase differences of the first phase difference controlling element 60 and the second phase difference controlling element 70 are set to be λ/4, an influence of an alignment failure due to a reverse tilt domain can be suppressed most.

$$I = I0 \cdot \sin 2(\pi \cdot \Delta nd/\lambda) \qquad \text{Equation (2)}$$

However, when the light entering the liquid crystal panel 100 is the circularly polarized light L3a, light leakage of the circularly polarized light L3a entering the liquid crystal panel 100 is easily caused by a phase change at the time of reflection on the side surfaces of the wiring lines 8 and 17 or the like, which easily degrades a contrast ratio.

Figure 7:
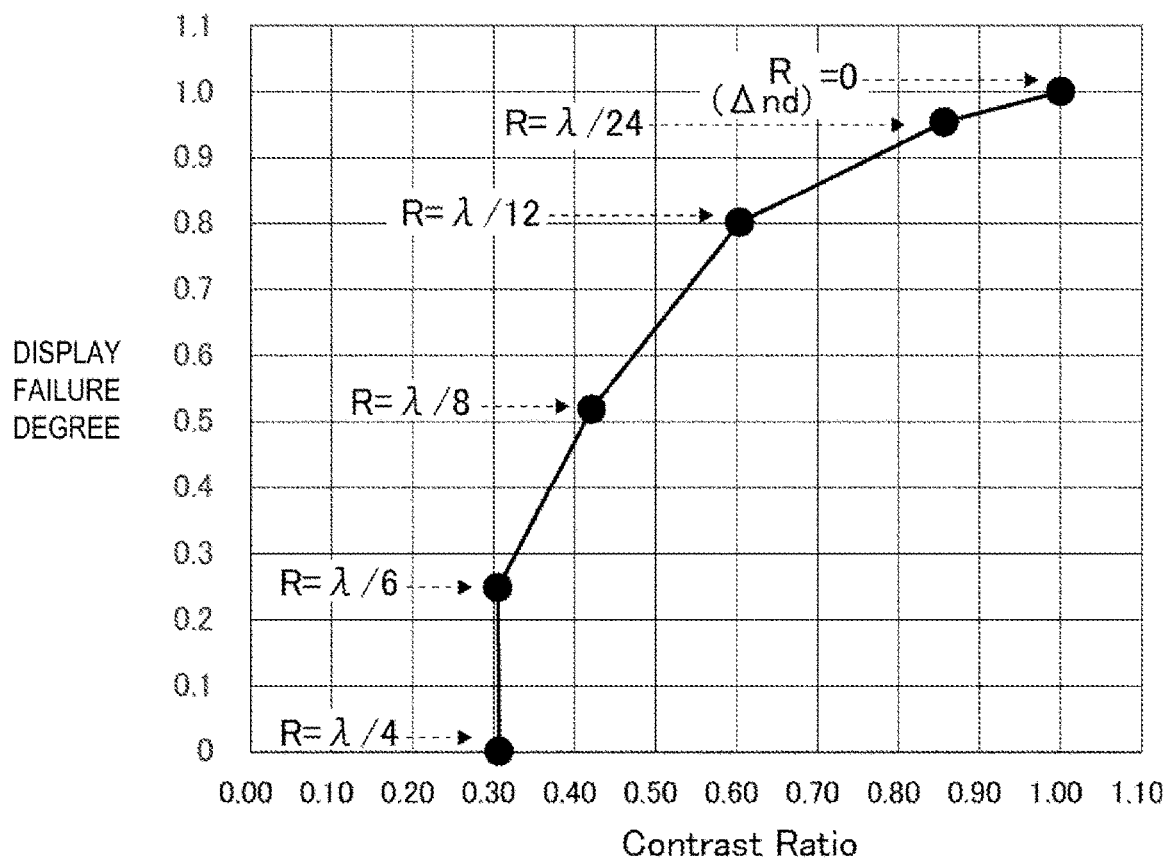
FIG. 7 is a graph showing a relationship between phase differences of phase difference controlling elements and display quality of an image.

FIG. 7 is a graph showing a relationship between the phase differences of the phase difference controlling elements and display quality of an image. The horizontal axis indicates a Contrast Ratio, and indicates that the contrast ratio is higher on the right side than the left side of the graph. The vertical axis indicates a degree of a display failure, and indicates that an influence of an alignment failure is larger on the upper side than on the lower side of the graph.

FIG. 7 illustrates an influence on a display failure of the liquid crystal panel 100 and a change of the contrast ratio when the phase differences of the first phase difference controlling element 60 and the second phase difference controlling element 70 are changed from zero to λ/4.

When the phase differences of the first phase difference controlling element 60 and the second phase difference controlling element 70 are controlled to be zero, in other words, in a linearly polarized light mode being the first mode, degradation of display quality due to an alignment failure cannot be improved, but a screen with a high contrast ratio can be displayed.

When the phase differences of the first phase difference controlling element 60 and the second phase difference controlling element 70 are controlled to be closer to λ/4, in other words, in an elliptically polarized light or circularly polarized light mode being the second mode, the contrast ratio is reduced, but degradation of display quality due to an alignment failure is improved.

In the present exemplary embodiment, based on screen data to be displayed or brightness of a room where display takes place, the values R of the phase differences of the first phase difference controlling element 60 and the second phase difference controlling element 70 are set to values falling within a range from zero to λ/4.

1.6. Outline of Phase Difference Control

Figure 8:
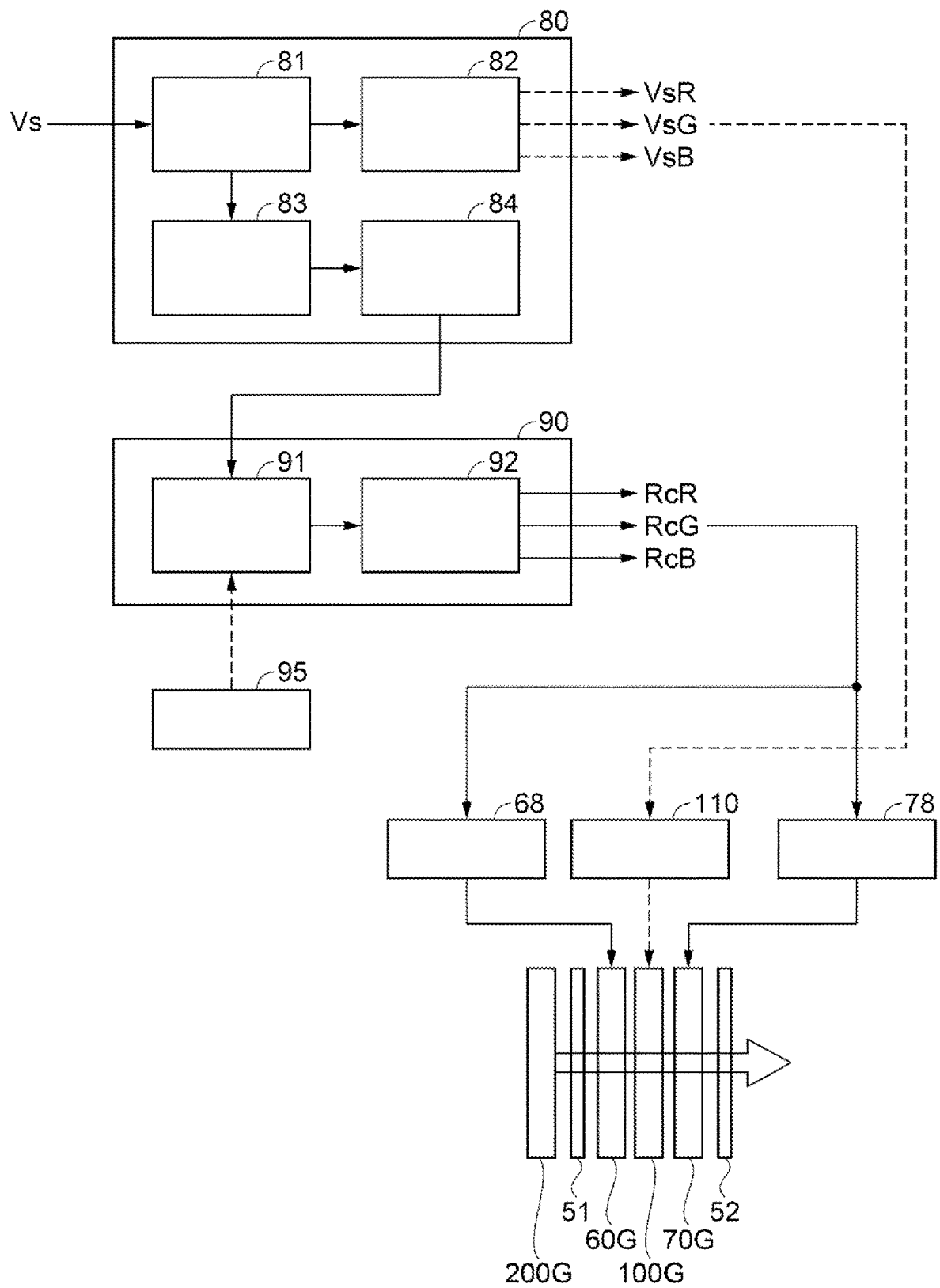
FIG. 8 is a functional block diagram illustrating a configuration relating to phase difference control.

FIG. 8 is a functional block diagram illustrating a configuration relating to phase difference control.

The image processing unit 80 includes a frame memory 81, an image signal output unit 82, a histogram generating unit 83, and an arithmetic unit 84. The frame memory 81 stores image data for one frame, based on an image signal Vs to be input. Based on the image signal Vs to be input, the image signal output unit 82 outputs a red image signal VsR to the liquid crystal panel 100R, outputs a green image signal VsG to the liquid crystal panel 100G, and outputs a blue image signal VsB to the liquid crystal panel 100B.

The histogram generating unit 83 generates a luminance histogram, based on the image data for one frame, which is stored in the frame memory 81. Based on the generated luminance histogram, the arithmetic unit 84 performs an arithmetic operation for obtaining an average tone of a display screen for one frame, and outputs average tone information K. Note that, based on the generated luminance histogram, the arithmetic unit 84 may perform an arithmetic operation for obtaining a contrast of a display screen for one frame, which is as described later, and output the contrast.

The phase difference adjusting unit 90 includes a phase difference determining unit 91 and a phase difference control signal output unit 92.

Based on the average tone information K of the display screen for one frame, which is output from the arithmetic unit 84 of the image processing unit 80, the phase difference determining unit 91 determines phase differences of the first phase difference controlling elements 60R, 60G, and 60B and the second phase difference controlling elements 70R, 70G, and 70B. The phase difference adjusting unit 90 includes a table in which the average tone information K and the phase differences are associated with each other, and the phase differences are determined based on the table.

Based on the phase differences determined by the phase difference determining unit 91, the phase difference control signal output unit 92 outputs the phase difference control signals RcR, RcG, and RcB for controlling the phase differences of the first phase difference controlling elements 60R, 60G, and 60B and the second phase difference controlling elements 70R, 70G, and 70B of the liquid crystal devices 1R, 1G, and 1B, respectively.

In the liquid crystal device 1G, the phase difference control signal RcG is input to a first phase difference controlling element driving unit 68 and a second phase difference controlling element driving unit 78 being control units. Note that a configuration further including the image processing unit 80 and the histogram generating unit 83 may be regarded as the control unit. A configuration further including the brightness detecting unit 95 may be regarded as the control unit.

The first phase difference controlling element driving unit 68 controls the phase difference of the first phase difference controlling element 60G, based on the phase difference control signal RcG. The first phase difference controlling element driving unit 68 controls a voltage to be applied to the electrodes 63 and 64 so that the phase difference of the liquid crystal layer 67 is equal to the phase difference determined by the phase difference determining unit 91.

The second phase difference controlling element driving unit 78 controls the phase difference of the second phase difference controlling element 70G, based on the phase difference control signal RcG. the second phase difference controlling element driving unit 78 controls a voltage to be applied to the electrodes 73 and 74 so that the phase difference of the liquid crystal layer 77 is equal to the phase difference determined by the phase difference determining unit 91.

Note that the first phase difference controlling element driving units 68 and the second phase difference controlling element driving units 78 of the liquid crystal device 1R and the liquid crystal device 1B are also configured similarly to the liquid crystal device 1G.

The phase difference control signals RcG to be input to the first phase difference controlling element driving unit 68 and the second phase difference controlling element driving unit 78 are not required to be the same signal, and different signals may be input to the first phase difference controlling element driving unit 68 and the second phase difference controlling element driving unit 78. For example, the phase difference control signal RcG may be adjusted so that the phase difference of the liquid crystal layer 67 is smaller than the phase difference of the liquid crystal layer 77. In consideration of the phase difference of the liquid crystal layer 5 during black display of the liquid crystal panel 100, in other words, while no driving voltage is applied to the liquid crystal layer 5, a contrast is improved when the phase difference of the liquid crystal layer 67 of the first phase difference controlling element 60G is smaller than the phase difference of the liquid crystal layer 77 of the second phase difference controlling element 70G.

Moreover, control is performed so that the total of the phase difference of the liquid crystal layer 67 of the first phase difference controlling element 60G and the phase difference of the liquid crystal layer 5 of the liquid crystal panel 100 during black display is equal to the phase difference of the liquid crystal layer 77 of the second phase difference controlling element 70G, and thus a contrast can further be improved.

The phase difference control signals RcR and RcB may also be adjusted similarly to the phase difference control signal RcG.

The phase difference control signals RcR, RcG, and RcB are adjusted so that degrees of reverse tilt domain generated on the liquid crystal panels 100R, 100G, and 100B are at the same degree on the liquid crystal panels 100R, 100G, and 100B.

Here, in order to make a degree of a reverse tilt domain equalized on the liquid crystal panels 100R, 100G, and 100B, the phase difference of the first phase difference controlling element 60 and the phase difference of the second phase difference controlling element 70 are controlled to be phase differences that are different on the liquid crystal devices 1R, 1G, and 1B.

For example, when a cell gap of each panel is the same on the liquid crystal panels 100R, 100G, and 100B, the VT characteristics of the liquid crystal panels 100R, 100G, and 100B are shifted to a high-voltage side as the panels correspond to colors with long wavelengths. This indicates that, among the liquid crystal panels 100R, 100G, and 100B, the liquid crystal panel 100R has the highest maximum luminance voltage at which brightness is maximized, the liquid crystal panel 100G has the second highest maximum luminance voltage, and the liquid crystal panel 100B has the lowest maximum luminance voltage. For example, when the maximum luminance voltage of the liquid crystal panel 100G is 4.5 V, the maximum luminance voltage of the liquid crystal panel 100R is 5.0 V, and the maximum luminance voltage of the liquid crystal panel 100B is 4.0 V. Thus, regarding the degree of generation of a reverse tilt domain while performing black and white display, the liquid crystal panel 100R with the large potential difference has the worst degree, and the liquid crystal panel 100B has the least degree.

Therefore, the phase differences of the first phase difference controlling elements 60R, 60G, and 60B and the second phase difference controlling elements 70R, 70G, and 70B are set so that the first phase difference controlling element 60R and the second phase difference controlling element 70R of the liquid crystal device 1R have the largest phase differences and the first phase difference controlling element 60B and the second phase difference controlling element 70B of the liquid crystal device 1B have the smallest phase differences.

For example, when the phase differences of the first phase difference controlling element 60G and the second phase difference controlling element 70G of the liquid crystal device 1G are set to be $\lambda/8$, the phase differences of the first phase difference controlling element 60R and the second phase difference controlling element 70R of the liquid crystal device 1R are set to be phase differences greater than $\lambda/8$, and the phase differences of the first phase difference controlling element 60B and the second phase difference controlling element 70B of the liquid crystal device 1B are set to be phase differences smaller than $\lambda/8$.

For example, when a liquid crystal material having a birefringence index $\Delta n$ smaller than those of the other panels is used for the liquid crystal panel 100B in order to equalize a light resistance lifetime of each panel on the liquid crystal panels 100R, 100G, and 100B, the VT characteristics of the liquid crystal panel 100B are shifted to a high-voltage side, and hence the maximum luminance voltage of the liquid crystal panel 100B is equivalent to the voltage of the liquid crystal panel 100R. In this case, regarding a reverse tilt domain during black and white display, the liquid crystal panel 100B is worse than the liquid crystal panel 100G.

Therefore, the phase differences of the first phase difference controlling elements 60R, 60G, and 60B and the second phase difference controlling elements 70R, 70G, and 70B are set so that the liquid crystal device 1B has a phase difference greater than that of the liquid crystal device 1G, and the liquid crystal device 1G is set to have the smallest phase difference.

Moreover, a cell gap of the liquid crystal panel 100B is increased as a countermeasure for a case in which the maximum luminance voltage of the liquid crystal panel 100B exceeds the maximum driving voltage by using a liquid crystal material with a smaller birefringence index $\Delta n$ in order to elongate a light resistance lifetime of the liquid crystal panel 100B. However, when the cell gap is increased, a reverse tilt domain on the liquid crystal panel 100B gets worse.

In this case, the phase differences of the first phase difference controlling elements 60R, 60G, and 60B and the second phase difference controlling elements 70R, 70G, and 70B are also set so that the liquid crystal device 1B has a phase difference greater than that of the liquid crystal device 1G, and the liquid crystal device 1G is also set to have the smallest phase difference.

The phase difference control signals RcR, RcG, and RcB may be adjusted so that degrees of reverse tilt domain generated on the liquid crystal panels 100R, 100G, and 100B are at the different degrees on the liquid crystal panels 100R, 100G, and 100B. For example, the phase difference of the liquid crystal layer 67 of the first phase difference controlling element 60G and the phase difference of the liquid crystal layer 77 of the second phase difference controlling element 70G of the liquid crystal panel 100G corresponding to the green-colored light that has a high relative luminosity factor and that is easily noticeable with a display failure due to a reverse tilt domain are controlled to be greater than the other phase differences. Specifically, the phase differences of the first phase difference controlling element 60G and the second phase difference controlling element 70G of the liquid crystal device 1G are controlled in the second mode, and the phase differences of the first phase difference controlling elements 60B and 60R and the second phase difference controlling elements 70B and 70R of the liquid crystal device 1B and the liquid crystal device 1R are controlled in the first mode. Note that the phase differences of the first phase difference controlling element 60B and the second phase difference controlling element 70B of the liquid crystal device 1B may be smaller than the phase differences of the first phase difference controlling element 60R and the second phase difference controlling element 70R of the liquid crystal device 1R.

A panel driving unit 110 drives the liquid crystal panel 100G, based on the green image signal VsG. Note that the liquid crystal devices 1R and 1B are configured similarly to the liquid crystal device 1G.

The phase difference determining unit 91 may determine the phase difference, based on the brightness information from the brightness detecting unit 95. For example, when the screen 500 is installed at a bright location, a contrast CR with respect to a displayed image is reduced. Thus, even when the phase difference of the phase difference controlling element is increased so as to eliminate a display failure due to a reverse tilt domain, display contradiction is less likely to occur. Therefore, even when the second mode is selected based on the average tone information K, programming may be performed so as to select only the first mode.

The image processing unit 80, the phase difference adjusting unit 90, the first phase difference controlling element driving unit 68, the second phase difference controlling element driving unit 78, and the panel driving unit 110 may be mounted on an integrated circuit on one chip, or may be divided into a plurality of chips. The image processing unit 80, the phase difference adjusting unit 90, the first phase difference controlling element driving unit 68, the second phase difference controlling element driving unit 78, and the panel driving unit 110 may be mounted on a System on a Chip (SOC) of the projection-type display device 1000 being a display device or on a driving Integrated Circuit (IC) that drives the liquid crystal panel 100. Some of the functional blocks, for example, the image processing unit 80 and the phase difference adjusting unit 90 may be mounted on the SOC, and the first phase difference controlling element driving unit 68, the second phase difference controlling element driving unit 78, and the panel driving unit 110 may be mounted on the driving IC. These functional blocks may be formed at the substrate of the liquid crystal panel 100.

Figure 9:
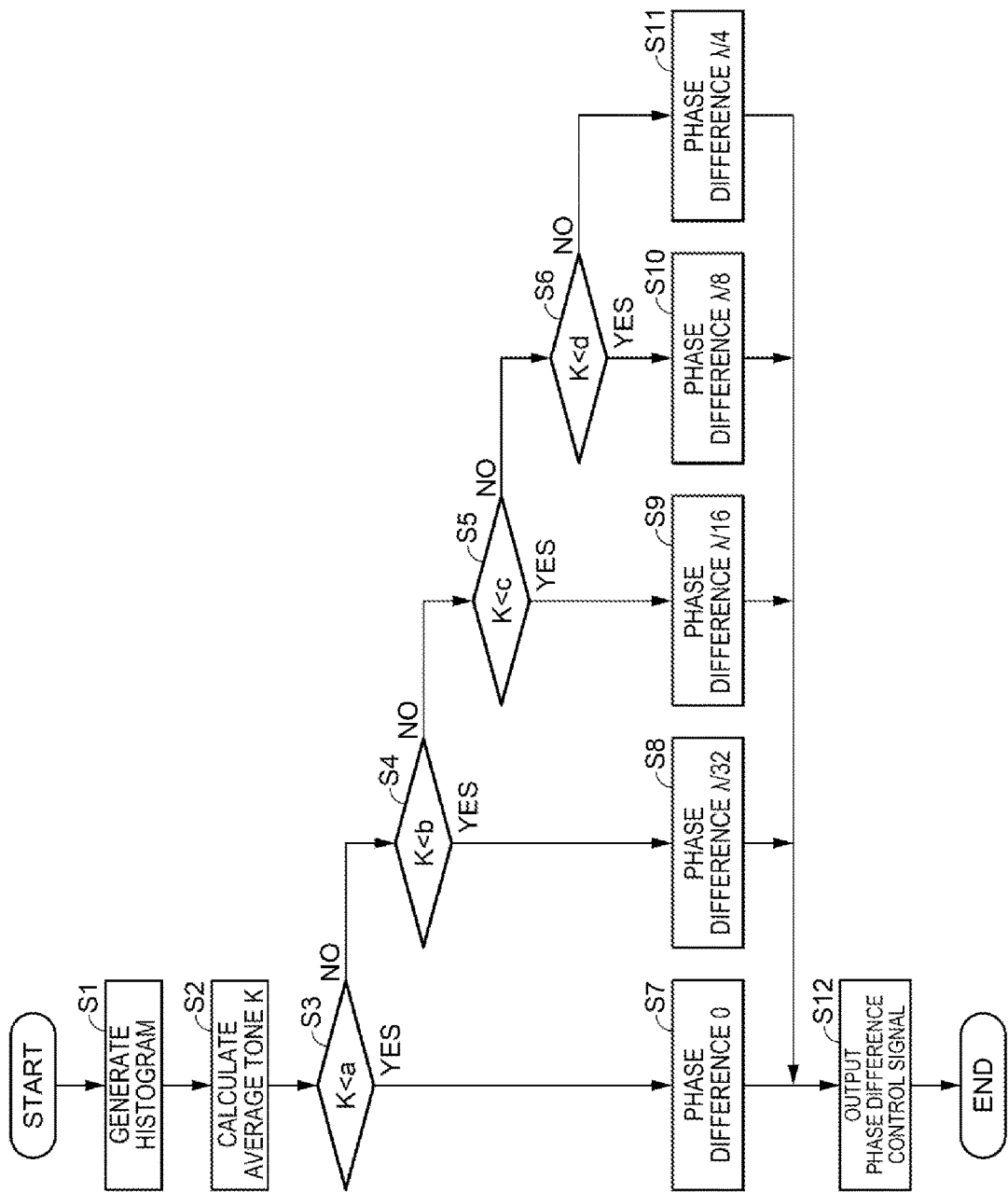
FIG. 9 is a flowchart for obtaining phase differences of the phase difference controlling elements, based on brightness.

FIG. 9 is a flowchart for obtaining phase differences of the phase difference controlling elements, based on brightness.

In Step S1, the histogram generating unit 83 generates a histogram of a tone Pn of each pixel, based on image data for one screen, which is stored in the frame memory 81.

Figure 10A:
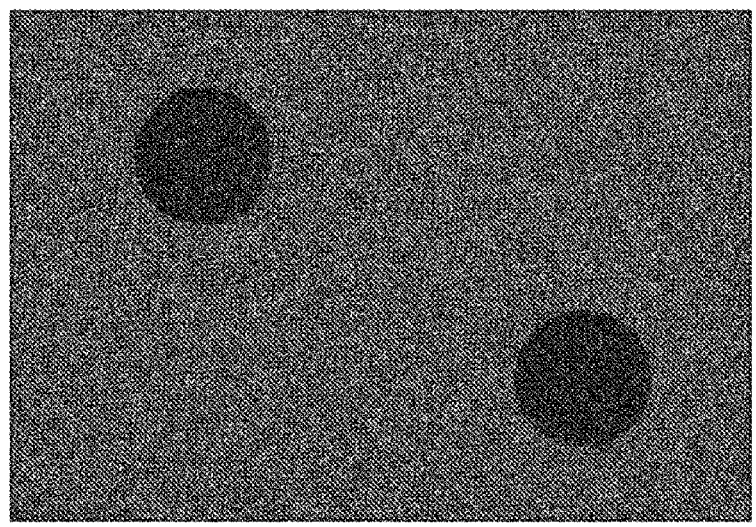
FIG. 10A is an explanatory diagram illustrating a dark display screen example.
Figure 10B:
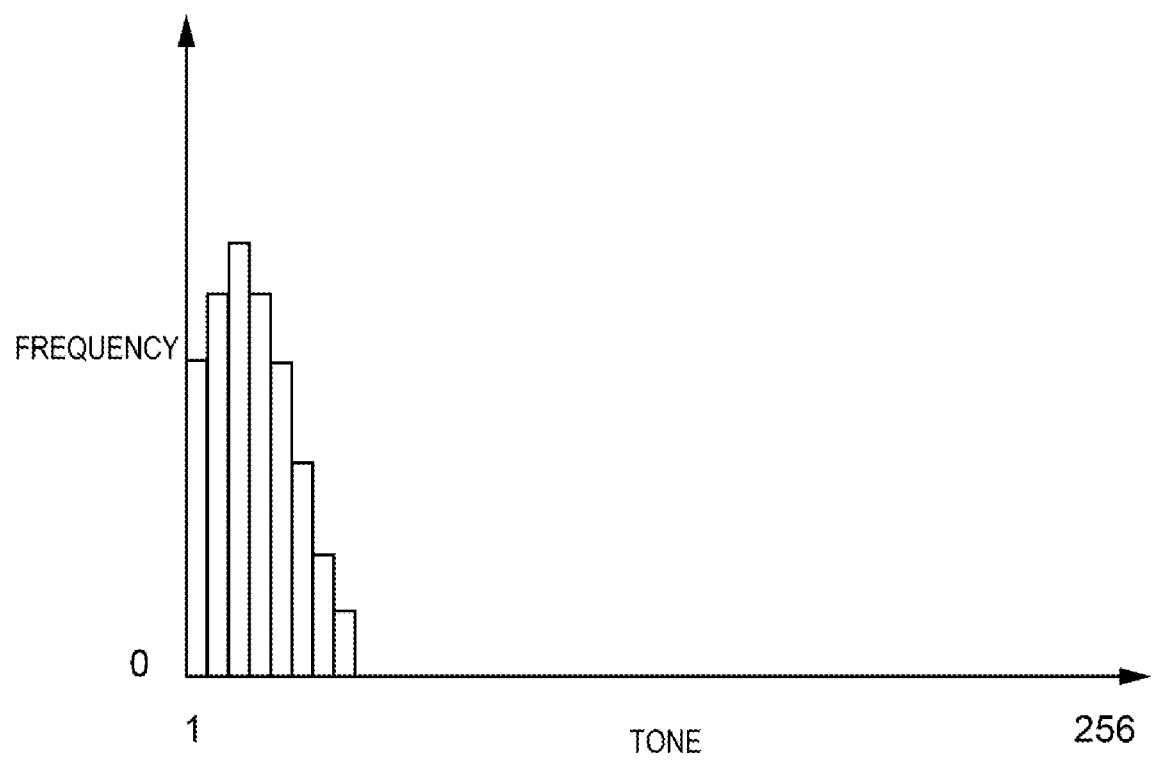
FIG. 10B is a luminance histogram of the dark display screen.

FIG. 10A is an explanatory diagram illustrating a dark display screen example, and illustrates a screen example in which black circles are displayed on a dark gray background. FIG. 10B is a luminance histogram of the dark display screen of FIG. 10A, and indicates the tone Pn on the horizontal axis and the frequency on the vertical axis.

When a dark screen is displayed as a whole as illustrated in FIG. 10A, the luminance histogram generated from the tone Pn of each pixel for one screen is a histogram having a high frequency on the low-tone side, as illustrated in FIG. 10B. In the case of the dark screen as described above, a horizontal electric field between adjacent pixels is not likely to be increased, and generation of a reverse tilt domain is rare. Even when a reverse tilt domain is generated, a display failure due to the reverse tilt domain is less likely to be visually recognized by a viewer.

Thus, in the present exemplary embodiment, when a dark screen is displayed, as described later, the first phase difference controlling element 60 and the second phase difference controlling element 70 are controlled in the first mode in which the phase differences are set to be zero.

Figure 11A:
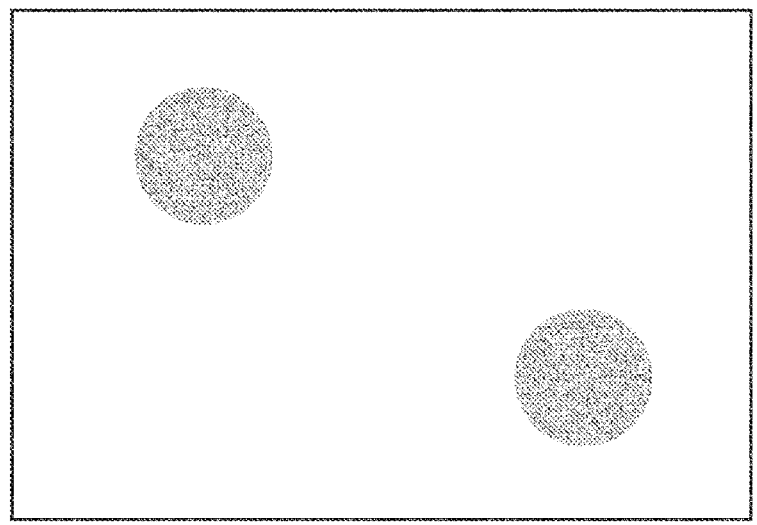
FIG. 11A is an explanatory diagram illustrating a bright display screen example.
Figure 11B:
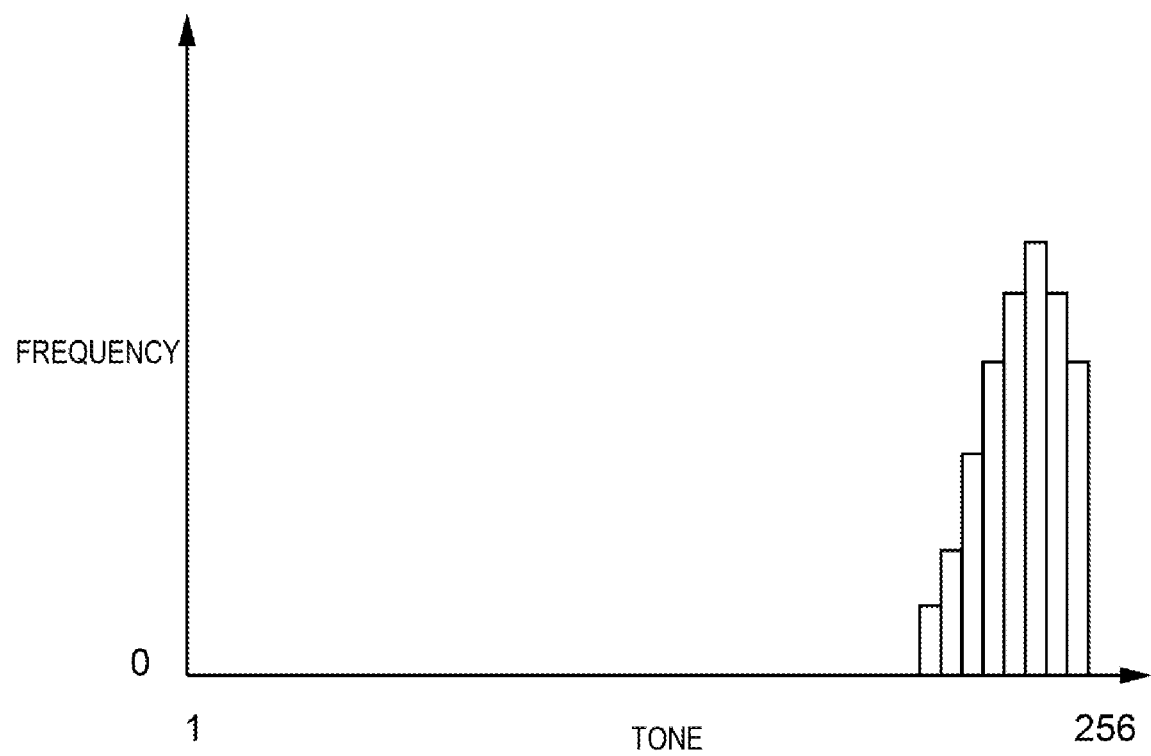
FIG. 11B is a luminance histogram of the bright display screen.

FIG. 11A is an explanatory diagram illustrating a bright display screen example, and illustrates a screen example in which pale gray circles are displayed on a bright white background. FIG. 11B is a luminance histogram of the bright display screen of FIG. 11A, and indicates the tone Pn on the horizontal axis and the frequency on the vertical axis, similarly to FIG. 10B.

In a case of a bright screen as a whole as illustrated in FIG. 11A, the luminance histogram generated from the tone Pn of each pixel for one screen is a histogram having a high frequency on the high-tone side, as illustrated in FIG. 11B. In the case of the bright screen as described above, a horizontal electric field between adjacent pixels is likely to be increased, and a reverse tilt domain is also likely to be generated. A display failure caused by a reverse tilt domain is visually recognized easily by a viewer.

Thus, in the present exemplary embodiment, when a bright screen is displayed, as described later, the first phase difference controlling element 60 and the second phase difference controlling element 70 are controlled in the second mode in which the phase differences are set to be $\lambda/8$, $\lambda/4$, or the like.

In the flowchart of FIG. 9, in Step S2, the arithmetic unit 84 calculates the average tone information K for one screen, based on the generated histogram.

In Step S3, Step S4, Step S5, and Step S6, the phase difference determining unit 91 determines the phase differences of the first phase difference controlling element 60 and the second phase difference controlling element 70. In Step S3, Step S4, Step S5, and Step S6, a is 50, b is 100, c is 150, and d is 200. Note that the values of a, b, c, and d are merely examples and may be changed as appropriate.

The phase difference determining unit 91 determines the phase differences, based on the table in which the average tone information K and the phase differences are associated with each other.

In Step S7, when it is determined that the average tone information K is smaller than a in Step S3, the phase difference determining unit 91 sets the phase difference to be zero.

In Step S8, when it is determined that the average tone information K is equal to or greater than a and smaller than b in Step S4, the phase difference determining unit 91 sets the phase difference to be $\lambda/32$.

In Step S9, when it is determined that the average tone information K is equal to or greater than b and smaller than c in Step S5, the phase difference determining unit 91 sets the phase difference to be $\lambda/16$.

In Step S10, when it is determined that the average tone information K is equal to or greater than c and smaller than d in Step S6, the phase difference determining unit 91 sets the phase difference to be $\lambda/8$.

In Step S11, when it is determined that the average tone information K is equal to or greater than d in Step S6, the phase difference determining unit 91 sets the phase difference to be λ/4.

The phase difference determining unit 91 performs control so that, on each of the liquid crystal devices 1R, 1G, and 1B, the phase difference of the first phase difference controlling element 60 and the phase difference of the second phase difference controlling element 70 are equal to each other. The phase differences may be corrected in accordance with individual differences of the first phase difference controlling element 60 and the second phase difference controlling element 70.

In Step S12, based on the phase differences determined by the phase difference determining unit 91, the phase difference control signal output unit 92 outputs the phase difference control signals RcR, RcG, and RcB for controlling the phase differences, to the first phase difference controlling elements 60R, 60G, and 60B and the second phase difference controlling elements 70R, 70G, and 70B of the liquid crystal devices 1R, 1G, and 1B.

The liquid crystal device 1R applies a voltage for driving the liquid crystal layer 67 of the first phase difference controlling element 60R and the liquid crystal layer 77 of the second phase difference controlling element 70R to the electrodes 63 and 64 of the first phase difference controlling element 60R and the electrodes 73 and 74 of the second phase difference controlling element 70R, based on the phase difference control signal RcR, and changes the alignment direction of the liquid crystal molecules 67a of the liquid crystal layer 67 and the alignment direction of the liquid crystal molecules 77a of the liquid crystal layer 77 to a desired direction between the vertical direction and the parallel direction with respect to the substrate surface. With this, each of the phase differences of the first phase difference controlling element 60R and the second phase difference controlling element 70R is controlled.

Similarly, based on the phase difference control signal RcG, the liquid crystal device 1G controls each of the phase differences of the first phase difference controlling element 60G and the second phase difference controlling element 70G. Based on the phase difference control signal RcB, the liquid crystal device 1B controls each of the phase differences of the first phase difference controlling element 60B and the second phase difference controlling element 70B.

In Step S7, when the phase difference is set to be zero, the first phase difference controlling elements 60R, 60G, and 60B and the second phase difference controlling elements 70R, 70G, and 70B are in the linearly polarized light mode being the first mode. Each of the phase differences of the first phase difference controlling elements 60R, 60G, and 60B and each of the phase differences of the second phase difference controlling elements 70R, 70G, and 70B are controlled so that the linearly polarized incident light is emitted as linearly polarized light without changing the polarization state.

In the case of the dark screen as in FIG. 10B, the first mode is selected, and display in which a contrast is prioritized is performed. In the case of the dark screen, a horizontal electric field between pixels is not likely to be increased, and generation of a reverse tilt domain is suppressed. Moreover, even when a reverse tilt domain is generated, an influence of an alignment failure is less likely to be visually recognized. Thus, each of the phase differences of the first phase difference controlling elements 60R, 60G, and 60B and each of the phase differences of the second phase difference controlling elements 70R, 70G, and 70B are controlled in the first mode, and hence display in which a contrast is prioritized can be performed, allowing display quality felt by a viewer to be improved.

From Step S8 to Step S11, the second mode is performed. In accordance with the phase differences, the first phase difference controlling elements 60R, 60G, and 60B change the linearly polarized incident light to elliptically polarized light or circularly polarized light, and emit the resultant light. In accordance with the phase differences, the second phase difference controlling elements 70R, 70G, and 70B convert the elliptically polarized incident light or circularly polarized incident light to linearly polarized light, and emit the resultant light. Note that, when the phase differences are λ/32, λ/16, or λ/8, the first phase difference controlling elements 60R, 60G, and 60B emit the elliptically polarized light. When the phase differences are λ/4, the circularly polarized light is emitted.

In the case of the bright screen as in FIG. 11B, a horizontal electric field between pixels is likely to be increased, and a reverse tilt domain is likely to be generated. Further, an influence of an alignment failure is likely to be visually recognized. Thus, each of the phase differences of the first phase difference controlling elements 60R, 60G, and 60B and each of the phase differences of the second phase difference controlling elements 70R, 70G, and 70B are controlled in the second mode, and hence display in which improvement of an alignment failure is prioritized can be performed, allowing display quality felt by a viewer to be improved.

As described above, according to the liquid crystal device 1 being the optical modulation module of the present exemplary embodiment, the following effects can be exerted. The liquid crystal device 1 according to the present exemplary embodiment includes the liquid crystal panel 100 including the liquid crystal layer 5 as the first liquid crystal layer, the first polarizing plate 51 provided on the incident surface side of the liquid crystal panel 100, the second polarizing plate 52 provided on the emission surface side of the liquid crystal panel 100, the first phase difference controlling element 60 as the first phase difference adjusting element arranged between the first polarizing plate 51 and the liquid crystal panel 100 and including the liquid crystal layer 67 as the second liquid crystal layer, the second phase difference controlling element 70 as the second phase difference adjusting element arranged between the liquid crystal panel 100 and the second polarizing plate 52 and including the liquid crystal layer 77 as the third liquid crystal layer, and the first phase difference controlling element driving unit 68 and the second phase difference controlling element driving unit 78 as the control units configured to control the phase difference of the liquid crystal layer 67 and the phase difference of the liquid crystal layer 77.

Note that the first polarizing element may be the laser light source 200 that emits linearly polarized light. The expression "based on an image displayed on the liquid crystal panel 100" is similar to the expression "based on the image data".

With this configuration, the phase difference of the first phase difference controlling element 60 and the phase difference of the second phase difference controlling element 70 can be controlled. Thus, when the polarization state of the light that enters and is emitted from the liquid crystal panel 100 is controlled, a display failure caused by generation of a reverse tilt domain can be controlled, and display quality as viewed by a viewer can be improved. Moreover, display quality as viewed by a viewer can be improved while keeping a balance with a contrast degraded by improving a display failure due to a reverse tilt domain.

In the liquid crystal device 1 according to the present exemplary embodiment, the first phase difference controlling element 60 includes the fourth alignment film 66 as the first incidence-side alignment film and the third alignment film 65 as the first emission-side alignment film that are arranged sandwiching the liquid crystal layer 67, the fourth alignment film 66 and the third alignment film 65 being inorganic alignment films configured to align the liquid crystal molecules 67a of the liquid crystal layer 67 in the first direction parallel to the alignment direction P, and the second phase difference controlling element 70 includes the sixth alignment film 76 as the second incidence-side alignment film and the fifth alignment film 75 as the second emission-side alignment film that are arranged sandwiching the liquid crystal layer 77, the sixth alignment film 76 and the fifth alignment film 75 being inorganic alignment films configured to align the liquid crystal molecules 77a of the liquid crystal layer 77 in the second direction intersecting with the first direction.

With this configuration, the polarization state of the light entering the liquid crystal panel 100 can be converted from linearly polarized light to linearly polarized light or circularly polarized light, and the polarization state of the light emitted from the liquid crystal panel 100 can be controlled from linearly polarized light or circularly polarized light to linearly polarized light. Thus, a display failure caused by generation of a reverse tilt domain can be controlled, and display quality as viewed by a viewer can be improved.

In the liquid crystal device 1 according to the present exemplary embodiment, the optically transparent region of the first phase difference controlling element 60 includes the first optically transparent region and the second optically transparent region. A value of a voltage applied to the liquid crystal layer 67 in the first optically transparent region and a value of a voltage applied to the liquid crystal layer 67 in the second optically transparent region are different from each other. The optically transparent region of the second phase difference controlling element 70 includes the third optically transparent region and the fourth optically transparent region. A value of a voltage applied to the liquid crystal layer 77 in the third optically transparent region and a value of a voltage applied to the third liquid crystal layer in the fourth optically transparent region are different from each other.

With this configuration, the polarization state of the light entering the liquid crystal panel 100 can be converted from linearly polarized light to linearly polarized light or circularly polarized light for each region, and the polarization state of the light emitted from the liquid crystal panel 100 can be controlled from linearly polarized light or circularly polarized light to linearly polarized light for each region. Thus, a display failure caused by generation of a reverse tilt domain can be controlled more finely, and display quality as viewed by a viewer can be improved.

In the liquid crystal device 1 according to the present exemplary embodiment, the thickness d2 of the liquid crystal layer 67 is equal to or thinner than the thickness d1 of the liquid crystal layer 5, and the thickness d3 of the liquid crystal layer 77 is equal to or thinner than the thickness d1 of the liquid crystal layer 5.

With this configuration, the thicknesses d2 and d3 of the liquid crystal layer 67 and the liquid crystal layer 77 are equal to or thinner than the thickness d1 of the liquid crystal layer 5, and hence degradation of contrast can be suppressed. Thus, display quality as viewed by a viewer can be improved.

In the liquid crystal device 1 according to the present exemplary embodiment, the birefringence index $\Delta n2$ of the liquid crystal material contained in the liquid crystal layer 67 is smaller than the birefringence index $\Delta n1$ of the liquid crystal material contained in the liquid crystal layer 5, and the birefringence index $\Delta n3$ of the liquid crystal material contained in the liquid crystal layer 77 is smaller than the birefringence index $\Delta n1$ of the liquid crystal material contained in the liquid crystal layer 5.

With this configuration, the birefringence indexes of the liquid crystal layer 67 and the liquid crystal layer 77 are smaller than the birefringence index of the liquid crystal layer 5, and hence a light resistance lifetime is elongated. Thus, the liquid crystals of the first phase difference controlling element 60 and the second phase difference controlling element 70 can be prevented from expiring prior to the liquid crystal panel 100, and the liquid crystal device 1 can be prevented from being unusable.

In the liquid crystal device 1 according to the present exemplary embodiment, the first phase difference controlling element driving unit 68 and the second phase difference controlling element driving unit 78 as the control units perform control so that the phase difference of the first phase difference controlling element 60 is smaller than the phase difference of the second phase difference controlling element 70.

With this configuration, in consideration of an influence due to the phase difference of the liquid crystal panel 100, the phase difference of the first phase difference controlling element 60 and/or the second phase difference controlling element 70 can be controlled. Thus, an accuracy for converting the polarization state of the light emitted from the liquid crystal panel 100 to linearly polarized light can be improved.

In the liquid crystal device 1 according to the present exemplary embodiment, the first phase difference controlling element driving unit 68 and the second phase difference controlling element driving unit 78 as the control units perform control so that the phase difference of the first phase difference controlling element 60 as the first phase difference adjusting element is greater than the phase difference of the second phase difference controlling element 70 as the second phase difference adjusting element.

With this configuration, in consideration of an influence due to the phase difference of the liquid crystal panel 100, the phase difference of the first phase difference controlling element 60 and/or the second phase difference controlling element 70 can be controlled. Thus, an accuracy for converting the polarization state of the light emitted from the liquid crystal panel 100 to linearly polarized light can be improved.

In the liquid crystal device 1 according to the present exemplary embodiment, the first phase difference controlling element driving unit 68 and the second phase difference controlling element driving unit 78 as the control units control the phase differences of the first phase difference controlling element 60 and the second phase difference controlling element 70 so that the total of the phase difference of the first phase difference controlling element 60 and the phase difference of the liquid crystal panel 100 during black display is equal to the phase difference of the second phase difference controlling element 70.

With this configuration, in consideration of an influence of the phase difference of the liquid crystal panel 100, the phase difference of the second phase difference controlling element 70 can be controlled. Thus, an accuracy for converting the polarization state of the light emitted from the liquid crystal panel 100 to linearly polarized light can be improved.

In the liquid crystal device 1 according to the present exemplary embodiment, the first phase difference controlling element driving unit 68 and the second phase difference controlling element driving unit 78 as the control units control the phase differences of the first phase difference controlling element 60 and the second phase difference controlling element 70 so that the phase difference of the first phase difference controlling element 60 as the first phase difference adjusting element is equal to the total of the phase difference of the liquid crystal panel 100 during black display and the phase difference of the second phase difference controlling element 70 as the second phase difference adjusting element.

With this configuration, in consideration of an influence due to the phase difference of the liquid crystal panel 100, the phase difference of the first phase difference controlling element 60 and/or the second phase difference controlling element 70 can be controlled. Thus, an accuracy for converting the polarization state of the light emitted from the liquid crystal panel 100 to linearly polarized light can be improved.

In the liquid crystal device 1 according to the present exemplary embodiment, the first phase difference controlling element driving unit 68 and the second phase difference controlling element driving unit 78 as the control units control the phase difference of the first phase difference controlling element 60 and the phase difference of the second phase difference controlling element 70, based on the image data relating to an image displayed on the liquid crystal panel 100.

With this configuration, a display failure caused by generation of a reverse tilt domain is controlled in accordance with an image to be displayed, and thus display quality as viewed by a viewer can be improved.

In the liquid crystal device 1 according to the present exemplary embodiment, the first phase difference controlling element driving unit 68 and the second phase difference controlling element driving unit 78 as the control units control the phase difference of the first phase difference controlling element 60 and the phase difference of the second phase difference controlling element 70 within a range of $0 \leq \Delta nd \leq \lambda/4$.

With this configuration, the polarization state of the light entering the liquid crystal panel 100 can be converted from linearly polarized light to linearly polarized light or circularly polarized light, and the polarization state of the light emitted from the liquid crystal panel 100 can be controlled from linearly polarized light or circularly polarized light to linearly polarized light. Thus, a display failure caused by generation of a reverse tilt domain can be controlled, and display quality as viewed by a viewer can be improved.

The liquid crystal device 1 according to the present exemplary embodiment includes the first phase difference controlling element 60 arranged between the first polarizing plate 51 and the liquid crystal panel 100 including the liquid crystal layer 5 and the second phase difference controlling element 70 arranged between the liquid crystal panel 100 and the second polarizing plate 52. The first phase difference controlling element 60 includes the liquid crystal layer 67, the electrodes 63 and 64 that drive the liquid crystal layer 67, and the fourth alignment film 66 and the third alignment film 65 that are arranged sandwiching the liquid crystal layer 67 and align the liquid crystal molecules 67a of the liquid crystal layer 67 in the first direction parallel to the alignment direction P. The second phase difference controlling element 70 includes the liquid crystal layer 77, the electrodes 73 and 74 that drive the liquid crystal layer 77, and the sixth alignment film 76 and the fifth alignment film 75 that are arranged sandwiching the liquid crystal layer 77 and align the liquid crystal molecules 77a of the liquid crystal layer 77 in the second direction intersecting with the first direction.

With this configuration, the polarization state of the light entering the liquid crystal panel 100 can be converted from linearly polarized light to linearly polarized light or circularly polarized light, and the polarization state of the light emitted from the liquid crystal panel 100 can be controlled from linearly polarized light or circularly polarized light to linearly polarized light. Thus, a display failure caused by generation of a reverse tilt domain can be controlled, and display quality as viewed by a viewer can be improved.

The projection-type display device 1000 as the display device according to the present exemplary embodiment includes the above-mentioned optical modulation module.

With this configuration, there can be provided the display device that can control a display failure, which is caused by generation of a reverse tilt domain, by controlling the polarization state of the light that enters and is emitted from the liquid crystal panel 100, and can improve display quality as viewed by a viewer.

In the display device including the liquid crystal panel 100G as the first liquid crystal panel that modulates light having the first wavelength, and the liquid crystal panel 100B as the second liquid crystal panel that modulates light having the second wavelength different from the first wavelength, the projection-type display device 1000 according to the present exemplary embodiment includes the first phase difference controlling element 60G arranged on the light incidence side of the liquid crystal panel 100G, the second phase difference controlling element 70G arranged on the light emission side of the liquid crystal panel 100G, and the phase difference adjusting unit 90 as the control unit that controls the phase difference of the first phase difference controlling element 60G and the phase difference of the second phase difference controlling element 70G.

With this configuration, the polarization state of the light that enters and is emitted from the liquid crystal panel 100G included in the projection-type display device 1000 is controlled, so that a display failure caused by generation of a reverse tilt domain can be controlled, and display quality as viewed by a viewer can be improved.

Note that the first liquid crystal panel and the second liquid crystal panel may be regarded as the liquid crystal panel 100R and the liquid crystal panel 100G, respectively.

The projection-type display device 1000 according to the present exemplary embodiment includes the first phase difference controlling element 60B as the third phase difference adjusting element arranged on the light incidence side of the liquid crystal panel 100B, and the second phase difference controlling element 70B as the fourth phase difference adjusting element arranged on the light emission side of the liquid crystal panel 100B. The phase difference adjusting unit 90 performs control so that each of the phase difference of the first phase difference controlling element 60G and the phase difference of the second phase difference controlling element 70G of the liquid crystal panel 100G is the first phase difference, and performs control so that each of the phase difference of the first phase difference controlling element 60B and the phase difference of the second phase difference controlling element 70B of the liquid crystal panel 100B is the second phase difference different from the first phase difference.

With this configuration, even when the liquid crystal panel 100G and the liquid crystal panel 100B have different display failures caused by reverse tilt domains, the display failures caused by generation of the reverse tilt domains can be controlled for each of the liquid crystal panels. Thus, display quality as viewed by a viewer can be improved.

In the projection-type display device 1000 according to the present exemplary embodiment, when the liquid crystal driving voltage at the maximum luminance of the liquid crystal panel 100G is higher than the liquid crystal driving voltage at the maximum luminance of the liquid crystal panel 100B, the phase difference adjusting unit 90 performs control so that the first phase difference is greater than the second phase difference.

With this configuration, the phase difference can be controlled in accordance with a degree of generation of a reverse tilt domain. Thus, display quality as viewed by a viewer can be improved.

In the projection-type display device 1000 according to the present exemplary embodiment, the thickness of the liquid crystal layer 5 of the liquid crystal panel 100G is thinner than the thickness of the liquid crystal layer 5 of the liquid crystal panel 100B.

With this configuration, when the thickness of the liquid crystal layer 5 differs for each of the liquid crystal panels, the phase difference can be controlled for each of the liquid crystal panels. Thus, display quality as viewed by a viewer can be improved.

In the projection-type display device 1000 according to the present exemplary embodiment, the birefringence index Δn of the liquid crystal layer of the liquid crystal panel 100B is smaller than the birefringence index Δn of the liquid crystal layer 5 of the liquid crystal panel 100G.

With this configuration, the liquid crystal material having the small birefringence index Δn is used for the liquid crystal layer 5 of the liquid crystal panel 100B corresponding to the blue-colored light having a short wavelength. Thus, a light resistance lifetime of the liquid crystal panel 100B can be elongated, and a light resistance lifetime of the liquid crystal panel 100B can be as long as the liquid crystal panel 100G corresponding to the green-colored light and the liquid crystal panel 100R corresponding to the red-colored light.

In the projection-type display device 1000 according to the present exemplary embodiment, when the birefringence index Δn of the liquid crystal layer 5 of the liquid crystal panel 100B is smaller than the birefringence index Δn of the liquid crystal layer 5 of the liquid crystal panel 100G, the phase difference adjusting unit 90 sets the second phase difference to be greater than the first phase difference, the second phase difference being the phase difference of the first phase difference controlling element 60B and the second phase difference controlling element 70B of the liquid crystal panel 100B, the first phase difference being the phase difference of the first phase difference controlling element 60G and the second phase difference controlling element 70G of the liquid crystal panel 100G.

With this configuration, the liquid crystal material having the small birefringence index Δn is used for the liquid crystal layer 5 of the liquid crystal panel 100B corresponding to the blue-colored light having a short wavelength. Thus, a light resistance lifetime of the liquid crystal panel 100B can be elongated. Further, the first phase difference is greater than the second phase difference, and hence degrees of display failures caused by reverse tilt domains generated on the liquid crystal panel 100B and the liquid crystal panel 100G can be equalized between the liquid crystal panel 100B and the liquid crystal panel 100G.

The optical modulation module 4 includes the liquid crystal panel 100 including the liquid crystal layer 5 as the first liquid crystal layer, the first polarizing plate 51 provided on the light incidence side of the liquid crystal panel 100, the second polarizing plate 52 provided on the light emission side of the liquid crystal panel 100, the first phase difference controlling element 60 as the first phase difference adjusting element, and the second phase difference controlling element 70 as the second phase difference adjusting element. The first phase difference controlling element 60 to which a voltage is applied in accordance with an image displayed on the liquid crystal panel 100 is arranged between the first polarizing plate 51 and the liquid crystal panel 100, and includes the liquid crystal layer 67 as the second liquid crystal layer. The second phase difference controlling element 70 to which a voltage is applied in accordance with an image displayed on the liquid crystal panel 100 is arranged between the liquid crystal panel 100 and the second polarizing plate 52, and includes the liquid crystal layer 77 as the third liquid crystal layer.

With this configuration, the polarization state of the light entering the liquid crystal panel 100 can be controlled based on an image displayed on the liquid crystal panel 100. Thus, display quality as viewed by a viewer can be improved.

2. Second Exemplary Embodiment 2.1. Outline of Phase Difference Control

Figure 12:
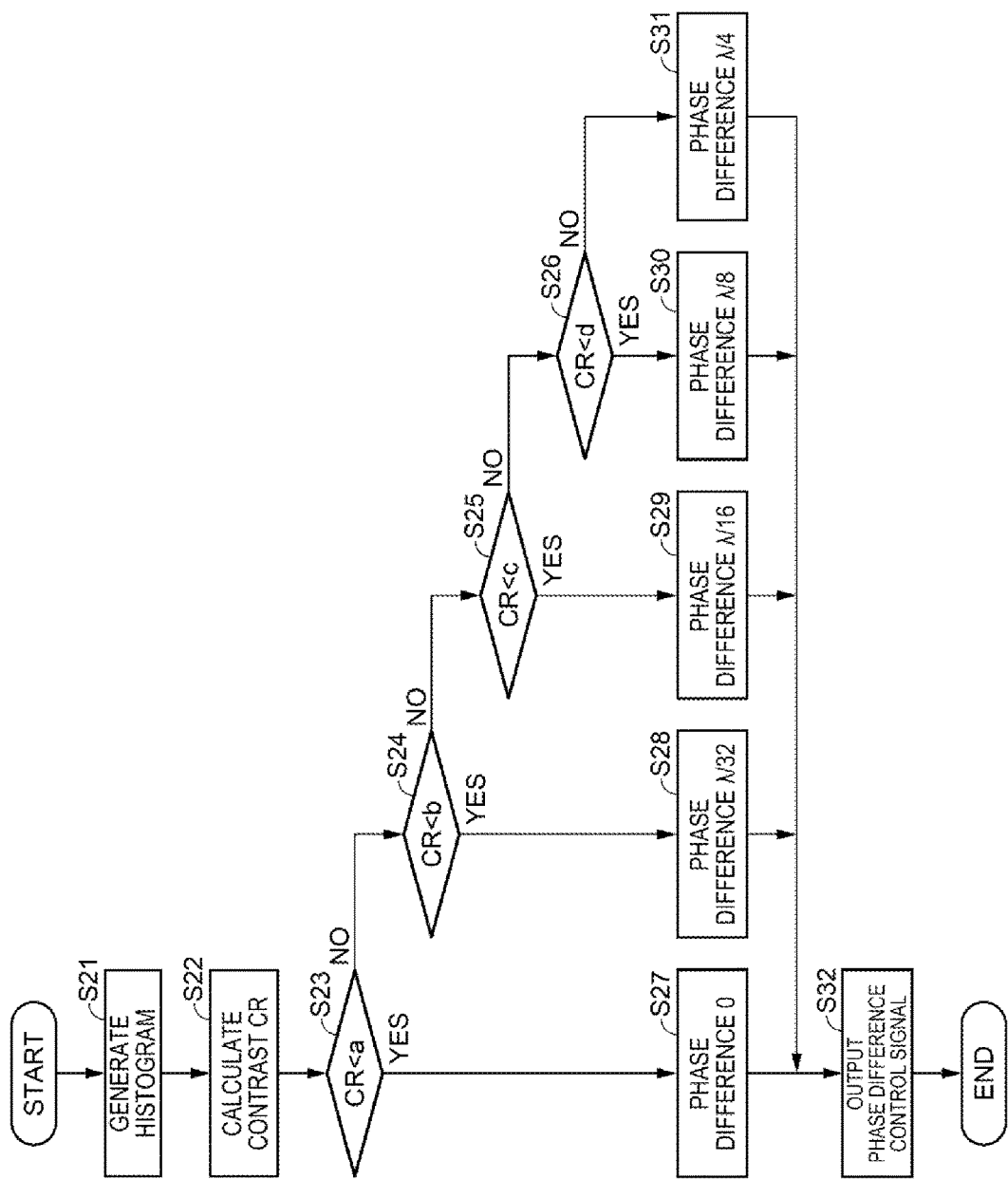
FIG. 12 is a flowchart for obtaining phase differences of the phase difference controlling elements, based on a contrast.

FIG. 12 is a flowchart for obtaining phase differences of the phase difference controlling elements, based on a contrast.

In Step S21, the histogram generating unit 83 generates a histogram of the tone Pn of each pixel, based on image data for one screen, which is stored in the frame memory 81.

Figure 13A:
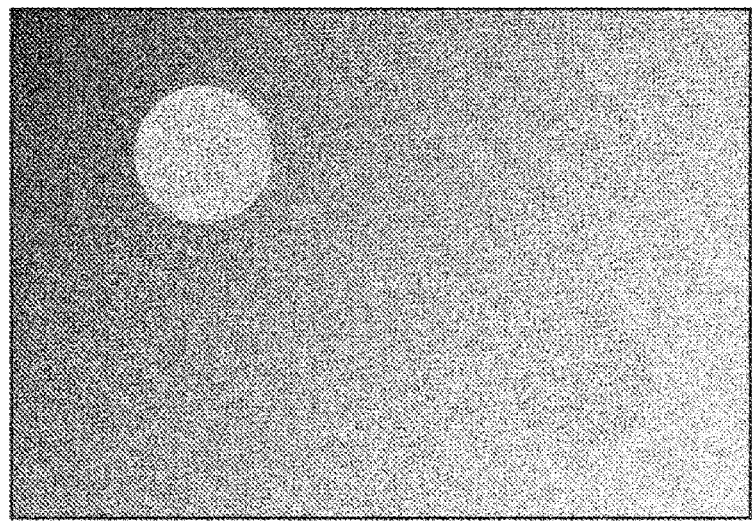
FIG. 13A is an explanatory diagram illustrating a low-contrast display screen example.
Figure 13B:
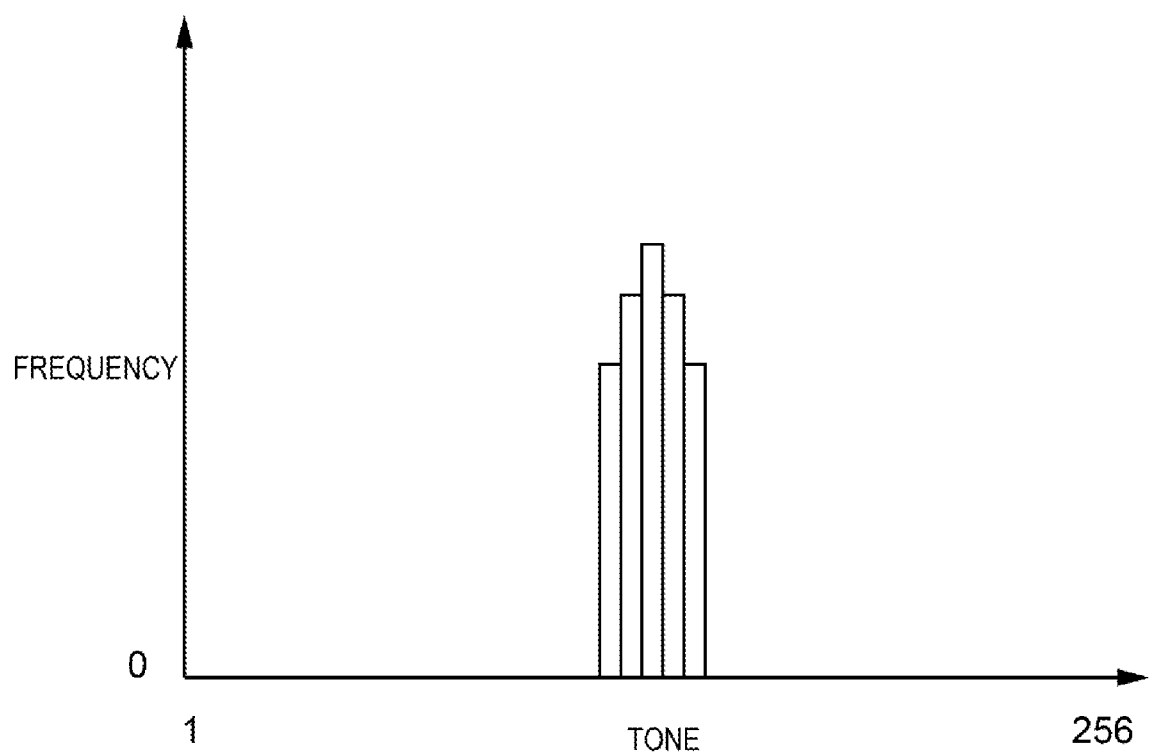
FIG. 13B is a luminance histogram of the low-contrast display screen.

FIG. 13A is an explanatory diagram illustrating a low-contrast display screen example, and illustrates a screen example with a small difference in brightness on the screen as a whole. FIG. 13B is a luminance histogram of the low-contrast display screen of FIG. 13A, and indicates the tone Pn on the horizontal axis and the frequency on the vertical axis.

When the screen with a small difference in brightness on the screen as a whole as illustrated in FIG. 13A is displayed, the luminance histogram generated from the tone Pn of each pixel for one screen is a histogram having one large convex shape as illustrated in FIG. 13B. In a case of the low-contrast screen as described above, a horizontal electric field between adjacent pixels is not likely to be increased, and generation of a reverse tilt domain is rare. Even when a reverse tilt domain is generated, a display failure due to the reverse tilt domain is less likely to be visually recognized by a viewer.

Thus, in the present exemplary embodiment, when a dark screen is displayed, as described later, the first phase difference controlling element 60 and the second phase difference controlling element 70 are controlled in the first mode in which the phase differences are set to be zero.

Figure 14A:
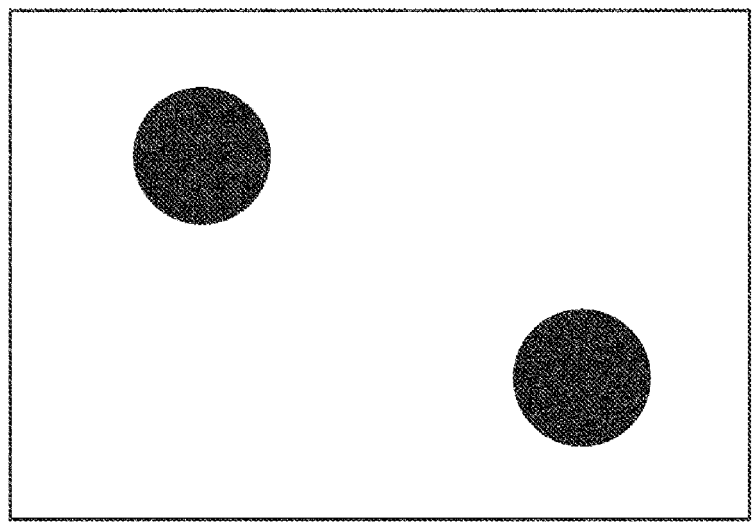
FIG. 14A is an explanatory diagram illustrating a high-contrast display screen example.
Figure 14B:
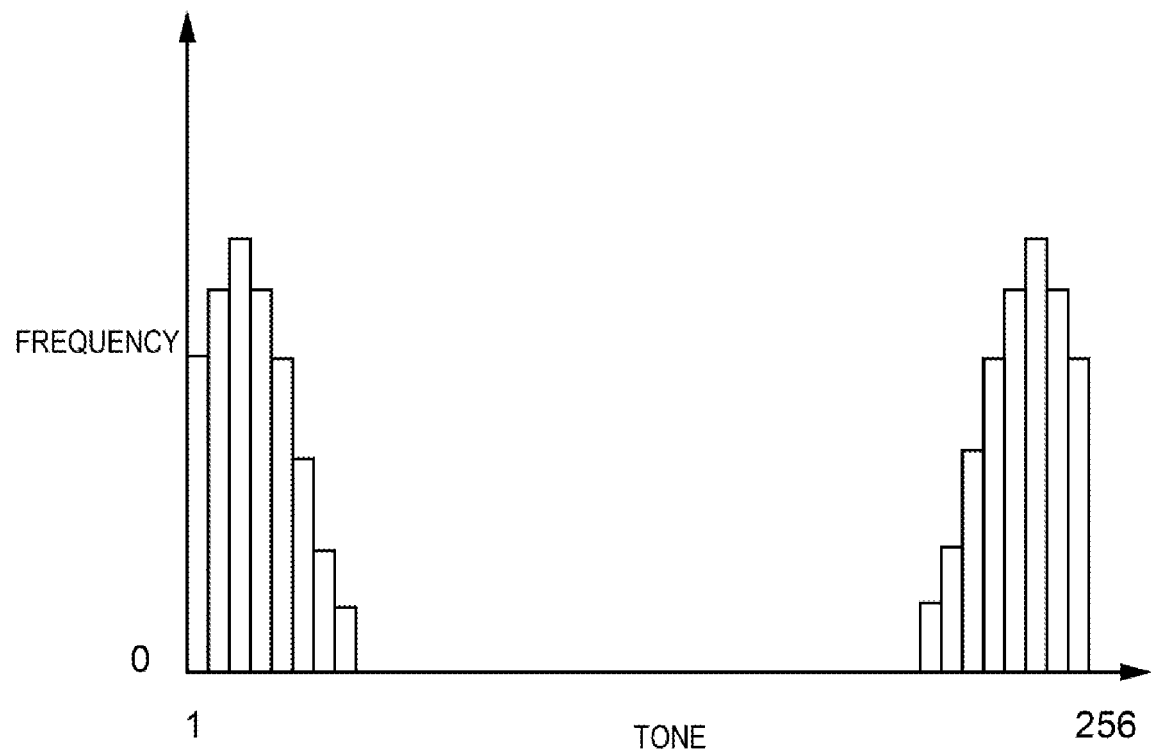
FIG. 14B is a luminance histogram of the high-contrast display screen.

FIG. 14A is an explanatory diagram illustrating a high-contrast display screen example, and illustrates a screen example with a large difference in brightness including black and white. FIG. 14B is a luminance histogram of the high-contrast display screen of FIG. 14A, and indicates the tone Pn on the horizontal axis and the frequency on the vertical axis, similarly to FIG. 13B.

When a highly bright screen is displayed as illustrated in FIG. 14A, the luminance histogram generated from the tone Pn of each pixel for one screen is a histogram having large convex shapes at two positions away from each other as illustrated in FIG. 14B. In a case of the high-contrast screen as described above, a horizontal electric field between adjacent pixels is likely to be increased, and a reverse tilt domain is also likely to be generated. A display failure caused by a reverse tilt domain is visually recognized easily by a viewer.

Thus, in the present exemplary embodiment, when a high-contrast screen is displayed, as described later, the first phase difference controlling element 60 and the second phase difference controlling element 70 are controlled in the second mode in which the phase differences are set to be λ/8, λ/4, or the like.

In the flowchart of FIG. 12, in Step S22, the arithmetic unit 84 calculates the contrast CR for one screen, based on the generated histogram. For example, the contrast CR is calculated from a tone difference between two tones with high frequencies. Note that, when there are three or more tones with high frequencies, the contrast CR may be obtained from two tone differences with greater tone differences.

In Step S23, Step S24, Step S25, and Step S26, the phase difference determining unit 91 determines the phase differences of the first phase difference controlling element 60 and the second phase difference controlling element 70. In Step S23, Step S24, Step S25, and Step S26, a is 500, b is 1000, c is 1500, and d is 2000. Note that the values of a, b, c, and d are merely examples and may be changed as appropriate.

The phase difference determining unit 91 determines the phase differences, based on the table in which the contrast CR and the phase differences are associated with each other.

In Step S27, when it is determined that the contrast CR is smaller than a in Step S23, the phase difference determining unit 91 sets the phase difference to be zero.

In Step S28, when it is determined that the contrast CR is equal to or greater than a and smaller than b in Step S24, the phase difference determining unit 91 sets the phase difference to be λ/32.

In Step S29, when it is determined that the contrast CR is equal to or greater than b and smaller than c in Step S25, the phase difference determining unit 91 sets the phase difference to be λ/16.

In Step S30, when it is determined that the contrast CR is equal to or greater than c and smaller than d in Step S26, the phase difference determining unit 91 sets the phase difference to be λ/8.

In Step S31, when it is determined that the contrast CR is equal to or greater than d in Step S26, the phase difference determining unit 91 sets the phase difference to be λ/4.

The phase difference determining unit 91 performs control so that, on each of the liquid crystal devices 1R, 1G, and 1B, the phase difference of the first phase difference controlling element 60 and the phase difference of the second phase difference controlling element 70 are equal to each other. The phase differences may be corrected in accordance with individual differences of the first phase difference controlling element 60 and the second phase difference controlling element 70.

In Step S22, based on the phase differences determined by the phase difference determining unit 91, the phase difference control signal output unit 92 outputs the phase difference control signals RcR, RcG, and RcB for controlling the phase differences of the first phase difference controlling elements 60R, 60G, and 60B and the second phase difference controlling elements 70R, 70G, and 70B, to the first phase difference controlling elements 60R, 60G, and 60B and the second phase difference controlling elements 70R, 70G, and 70B of the liquid crystal devices 1R, 1G, and 1B.

Based on the phase difference control signal RcR, the liquid crystal device 1R applies a voltage for driving the liquid crystal layer 67 of the first phase difference controlling element 60R and the liquid crystal layer 77 of the second phase difference controlling element 70R, to the electrodes 63 and 64 of the first phase difference controlling element 60R and the electrodes 73 and 74 of the second phase difference controlling element 70R. With this, each of the phase differences of the first phase difference controlling element 60R and the second phase difference controlling element 70R is controlled.

Similarly, based on the phase difference control signal RcG, the liquid crystal device 1G controls each of the phase differences of the first phase difference controlling element 60G and the second phase difference controlling element 70G. Based on the phase difference control signal RcB, the liquid crystal device 1B controls each of the phase differences of the first phase difference controlling element 60B and the second phase difference controlling element 70B.

In Step S27, when the phase difference is set to be zero, the first phase difference controlling elements 60R, 60G, and 60B and the second phase difference controlling elements 70R, 70G, and 70B are in the linearly polarized light mode being the first mode, and the phase difference is controlled so that the linearly polarized incident light is emitted as linearly polarized light without changing the polarization state.

In a case of the low-contrast screen as in FIG. 13B, the first mode is selected, and display in which a contrast is prioritized is performed. In the case of the low-contrast screen, a horizontal electric field between pixels is not likely to be increased, and generation of a reverse tilt domain is suppressed. Moreover, even when a reverse tilt domain is generated, an influence of an alignment failure is less likely to be visually recognized by a viewer. Thus, when display in which a contrast is prioritized is performed as the first mode, display quality viewed and felt by a viewer can be improved.

From Step S28 to Step S31, the second mode is performed. In accordance with the phase difference, the first phase difference controlling element 60 changes the linearly polarized incident light to elliptically polarized light or circularly polarized light, and emits the resultant light. In accordance with the phase difference, the second phase difference controlling element 70 converts the elliptically polarized incident light or circularly polarized incident light to linearly polarized light, and emits the resultant light. Note that, when the phase difference is λ/32, λ/16, or λ/8, the second phase difference controlling element 70 converts the elliptically polarized incident light to linearly polarized light, and emits the resultant light. When the phase difference is λ/4, the second phase difference controlling element 70 converts the circularly polarized incident light to linearly polarized light, and emits the resultant light. When the phase difference is zero, the second phase difference controlling element 70 emits the linearly polarized incident light as linearly polarized light without conversion.

In a case of the high-contrast screen as in FIG. 14B, a horizontal electric field between pixels is likely to be increased, and a reverse tilt domain is likely to be generated. Further, an influence of an alignment failure is likely to be visually recognized. Thus, display in which improvement of an alignment failure is prioritized is performed as the second mode, and hence display quality viewed and felt by a viewer can be improved.

What is claimed is:

1. A display device including a first liquid crystal panel configured to modulate light having a first wavelength and a second liquid crystal panel configured to modulate light having a second wavelength different from the first wavelength, the display device comprising:
   a first phase difference adjusting element arranged on a light incidence side of the first liquid crystal panel and including a first liquid crystal layer;
   a second phase difference adjusting element arranged on a light emission side of the first liquid crystal panel and including a second liquid crystal layer; and
   a control unit configured to control a voltage applied to the first liquid crystal layer and the second liquid crystal layer,
   wherein a thickness of a liquid crystal layer of the first liquid crystal panel is thinner than a thickness of a liquid crystal layer of the second liquid crystal panel.

2. The display device according to claim 1, further comprising:
   a third phase difference adjusting element arranged on a light incidence side of the second liquid crystal panel and including a third liquid crystal layer; and
   a fourth phase difference adjusting element arranged on a light emission side of the second liquid crystal panel and including a fourth liquid crystal layer, wherein
   the control unit controls the voltage applied to the first liquid crystal layer and the second liquid crystal layer so that each of a phase difference applied to incident light by the first liquid crystal layer and a phase difference applied to incident light by the second liquid crystal layer is a first phase difference and
   the control unit controls a voltage applied to the third liquid crystal layer and the fourth liquid crystal layer so that each of a phase difference applied to incident light by the third liquid crystal layer and a phase difference applied to incident light by the fourth liquid crystal layer is a second phase difference different from the first phase difference.

3. The display device according to claim 2, wherein
   when a liquid crystal driving voltage of the first liquid crystal panel at maximum luminance is higher than a liquid crystal driving voltage of the second liquid crystal panel at maximum luminance, the control unit performs control so that the first phase difference is greater than the second phase difference.

4. The display device according to claim 2, wherein
   when a birefringence index $\Delta n$ of a liquid crystal layer of the second liquid crystal panel is smaller than a birefringence index $\Delta n$ of a liquid crystal layer of the first liquid crystal panel, the control unit sets the second phase difference greater than the first phase difference.

5. The display device according to claim 1, wherein
   a birefringence index $\Delta n$ of a liquid crystal layer of the second liquid crystal panel is smaller than a birefringence index $\Delta n$ of a liquid crystal layer of the first liquid crystal panel.

* * * * *